(12) United States Patent
Carobolante et al.

(10) Patent No.: US 11,929,673 B2
(45) Date of Patent: Mar. 12, 2024

(54) TWO-STAGE VOLTAGE CONVERTERS FOR MICROPROCESSORS

(71) Applicant: Ferric Inc., New York, NY (US)

(72) Inventors: Francesco Carobolante, Reno, NV (US); James T. Doyle, Prescott, AZ (US); Noah Andrew Sturcken, New York, NY (US)

(73) Assignee: Ferric Inc., New York, NY (US)

( * ) Notice: Subject to any disclaimer, the term of this patent is extended or adjusted under 35 U.S.C. 154(b) by 209 days.

(21) Appl. No.: 17/452,816

(22) Filed: Oct. 29, 2021

(65) Prior Publication Data

US 2023/0139978 A1    May 4, 2023

(51) Int. Cl.
*H02M 3/07*    (2006.01)
*G06F 1/26*    (2006.01)

(52) U.S. Cl.
CPC ............... *H02M 3/07* (2013.01); *G06F 1/26* (2013.01)

(58) Field of Classification Search
CPC ........ H02M 3/07; H02M 3/158; H02M 3/155; H02M 3/156; H02M 3/1584; H02M 3/1582; H02M 3/04; H02M 3/33546; H02M 3/33507; H02M 3/33515
See application file for complete search history.

(56) References Cited

U.S. PATENT DOCUMENTS

| | | | |
|---|---|---|---|
| 7,230,408 B1 | 6/2007 | Vinn et al. | |
| 7,538,565 B1 | 5/2009 | Beaman et al. | |
| 8,432,144 B2 | 4/2013 | Notani | |
| 9,177,944 B2 | 11/2015 | New | |
| 9,847,718 B2 | 12/2017 | Sturcken et al. | |
| 10,367,415 B1 | 7/2019 | Sturcken et al. | |
| 10,658,331 B2 | 5/2020 | Sturcken et al. | |
| 2003/0122240 A1 | 7/2003 | Lin et al. | |
| 2008/0164605 A1 | 7/2008 | Wu | |
| 2011/0304994 A1 | 12/2011 | Mair | |
| 2012/0326680 A1 | 12/2012 | Burns et al. | |
| 2014/0246773 A1 | 9/2014 | Kent | |
| 2014/0264935 A1 | 9/2014 | Kurashina et al. | |
| 2015/0043171 A1 | 2/2015 | Mugiya et al. | |
| 2015/0137776 A1 | 5/2015 | Thomas et al. | |

(Continued)

OTHER PUBLICATIONS

J. T. Doyle et al., "A Low Cost 100 MHz 2-Stage PSiP and Evolution to a Co-Packaged/Fully-Integrated Voltage Regulator for SoC Power Delivery", Dialog Semiconductor, 2019, pp. 1-8, IEEE.

(Continued)

*Primary Examiner* — Bryan R Perez
(74) *Attorney, Agent, or Firm* — Intrinsic Law Corp.

(57) ABSTRACT

An assembly includes a three-level voltage converter and a second voltage converter. The three-level voltage converter is electrically coupled to a battery to convert a battery supply voltage to an intermediate voltage. The second voltage converter is electrically coupled to the three-level voltage converter to convert the intermediate voltage to a processor-supply voltage to operate a processor. At least the second voltage converter and the processor are mounted on a processor-package substrate. The three-level voltage converter can be mounted on the processor-package substrate or on a circuit board on which the processor-package substrate is mounted.

16 Claims, 18 Drawing Sheets

(56) References Cited

U.S. PATENT DOCUMENTS

| | | |
|---|---|---|
| 2015/0169025 A1* | 6/2015 | Sizikov .................... G06F 1/26 |
| | | 327/540 |
| 2015/0255411 A1 | 9/2015 | Karhade et al. |
| 2016/0113115 A1 | 4/2016 | Kwon et al. |
| 2017/0236809 A1 | 8/2017 | Trimberger et al. |
| 2018/0130762 A1 | 5/2018 | Tuominen et al. |
| 2018/0254700 A1* | 9/2018 | Hu ....................... H02M 3/1584 |
| 2019/0089244 A1* | 3/2019 | Koski ................... H02M 7/003 |
| 2022/0123656 A1* | 4/2022 | Wu ..................... H02M 3/1588 |

OTHER PUBLICATIONS

P Zou et al., "Powering 5G Era Computing Platforms—the Road toward Integrated Power Delivery", Proceedings of the 31sts International Symposium on Power Semiconductor Devices & IC's, May 2019, pp. 1-6, IEEE.

M. Deo, "Enabling Next-Generation Platforms Using Intel's 3D System-in-Package Technology", White Paper, Sep. 4, 2017, pp. 1-7, Intel Corporation.

N. A. Sturcken, "Integrated Voltage Regulators with Thin-Film Magnetic Power Inductors", 2013, Columbia University.

ISA, "International Search Report", PCT/US2018/048290, dated Nov. 21, 2018.

\* cited by examiner

TWO-STAGE VOLTAGE CONVERTERS FOR MICROPROCESSORS

TECHNICAL FIELD

This application relates generally to voltage converters for microelectronic devices.

BACKGROUND

Microelectronic devices include voltage converters (e.g., Buck converters or low-dropout regulators) that down-convert the voltage supplied by a battery or a DC voltage source to a lower voltage that can be used by the processor. For single-stage conversion, due to the size of the components, existing voltage converters are located outside of the processor package substrate on which the processor (or system-on-a-chip) is mounted. To maintain the processor-supply voltage within the tight tolerances required for state-of-the-art processors, additional output capacitors (and/or other passive components) are used. However, these output capacitors increase the parasitic impedance between the voltage converter and the processor, which increases power losses and degrades performance. They also add significant cost and/or bulkiness to the application.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to an assembly comprising a first three-level voltage converter having an input electrically coupled to a voltage source to receive a battery-supply voltage, the first three-level voltage converter configured to convert the battery-supply voltage to an intermediate voltage at an output of the first three-level voltage converter, the intermediate voltage lower than the battery-supply voltage. The assembly further comprises a processor module comprising: a processor package substrate; a second three-level voltage converter mounted on the processor package substrate, the second three-level voltage converter having an input electrically coupled to the output of the first three-level voltage converter to receive the intermediate voltage, the second three-level voltage converter configured to convert the intermediate voltage to a processor-supply voltage at an output of the second three-level voltage converter, the processor-supply voltage lower than the intermediate voltage; and a processor chip mounted on the processor package substrate, the processor chip having an input that is electrically coupled to the output of the second three-level voltage converter to receive the processor-supply voltage. The assembly further comprises a controller that adjusts the intermediate voltage depending on the battery-supply voltage and a requested voltage by the processor to maximize a voltage conversion efficiency and/or to reduce a processor-supply voltage ripple.

In one or more embodiments, the controller is integrated with the first three-level voltage converter, with the second three-level voltage converter and/or inside the processor chip. In one or more embodiments, the first three-level voltage converter, the second three-level voltage converter, and the controller are integrated in the same semiconductor process, which can be separate or co-integrated with the processor. In one or more embodiments, the first three-level voltage converter and the controller are mounted on the processor package substrate.

In one or more embodiments, the first three-level voltage converter is mounted on a printed circuit board. In one or more embodiments, the first three-level voltage converter is mounted on the processor package substrate. In one or more embodiments, the first three-level voltage converter is configured to operate at a first frequency, the second three-level voltage converter is configured to operate at a second frequency, and the second frequency is higher than the first frequency. In one or more embodiments, the second frequency is harmonically related to the first frequency and is 8 to 25 times higher than the first frequency.

In one or more embodiments, an input of the controller is electrically coupled to the voltage source to receive the battery-supply voltage. In one or more embodiments, the input of the controller is a first input, the output of the first three-level voltage converter is a first output, the output of the second three-level voltage converter is a first output, a second input of the controller is electrically coupled to an output of the first three-level voltage converter, a third input of the controller is electrically coupled to a second output of the second three-level voltage converter, and the controller is configured to receive a first duty-cycle feedback signal from the first three-level voltage converter and a second duty-cycle feedback signal from the second three-level voltage converter, the first duty-cycle feedback signal indicating a duty cycle of the first three-level voltage converter, the second duty-cycle feedback signal indicating a duty cycle of the second three-level voltage converter.

In one or more embodiments, the controller is configured to vary the duty cycle of the first three-level voltage converter to adjust the intermediate voltage. In one or more embodiments, the controller is configured to: sweep the intermediate voltage over a range while monitoring the duty cycles of the first and second three-level voltage converters to determine an optimal intermediate voltage at which a product of the duty cycles of the first and second three-level voltage converters is minimized to maximize the voltage conversion efficiency, and set the duty cycle of the first three-level voltage converter such that the first three-level voltage converter produces the optimal intermediate voltage. In one or more embodiments, the controller is configured to: sweep the intermediate voltage over a range while monitoring the processor-supply voltage to determine an optimal intermediate voltage at which the processor-supply voltage ripple is minimized, and set the duty cycle of the first three-level voltage converter such that the first three-level voltage converter produces the optimal intermediate voltage.

In one or more embodiments, the first three-level voltage converter comprises a single phase and the second three-level voltage converter comprises a multi-phase interleaved three-level voltage converter. In one or more embodiments, a delay and an overshoot of the first three-level voltage converter are designed to at least partially cancel an overshoot or an undershoot of the processor-supply voltage, thus improving a settling time of the processor-supply voltage.

Another aspect of the invention is directed to an assembly comprising a three-level voltage converter having an input electrically coupled to a voltage source to receive a battery-supply voltage, the three-level voltage converter configured to convert the battery-supply voltage to an intermediate voltage at an output of the three-level voltage converter, the intermediate voltage lower than the battery-supply voltage. The assembly further comprises a processor module comprising: a processor package substrate; a switched-capacitor voltage converter mounted on the processor package substrate, the switched-capacitor voltage converter having an input electrically coupled to the output of the three-level voltage converter to receive the intermediate voltage, the switched-capacitor voltage converter configured to convert the intermediate voltage to a processor-supply voltage at an output of the switched-capacitor voltage converter, the processor-supply voltage lower than the intermediate voltage; and a processor chip mounted on the processor package substrate, the processor chip having an input that is electrically coupled to the output of the switched-capacitor voltage converter to receive the processor-supply voltage. The assembly further comprises a controller and a feedback line that electrically couples the output of the switched-capacitor voltage converter to an input of the controller.

In one or more embodiments, the switched-capacitor voltage converter comprises a fixed-ratio switched-capacitor voltage converter. In one or more embodiments, the fixed-ratio switched-capacitor voltage converter is configured to operate at a fixed frequency. In one or more embodiments, the three-level voltage converter and the fixed-ratio switched-capacitor voltage converter operate at different harmonically-related frequencies. In one or more embodiments, the input of the three-level voltage converter is a first input, and the assembly further comprises: a first feedback line that electrically couples an output of the voltage source to a first input of the controller; a second feedback line that electrically couples an output of the processor chip to a second input of the controller to receive a processor-supply requested voltage; and a third feedback line that electrically couples the output of the switched-capacitor voltage converter to a second input of the three-level voltage converter.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

Figure 1:
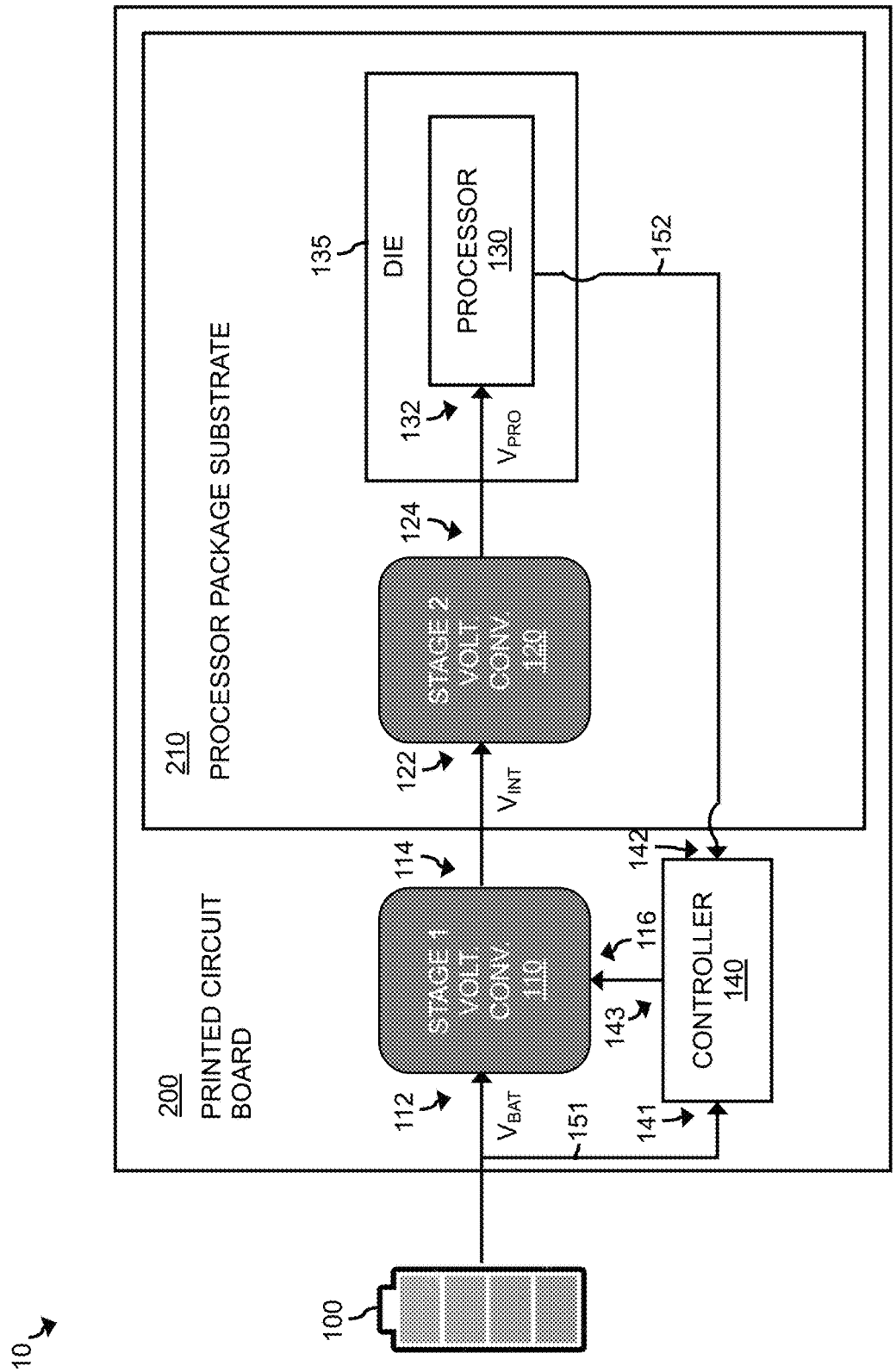
FIG. 1 is a block diagram of an assembly according to an embodiment.

FIG. 1 is a block diagram of an assembly 10 according to an embodiment. The assembly 10 includes a battery 100, a first-stage voltage converter 110, a second-stage voltage converter 120. The first-stage voltage converter 110 has an input 112 that is electrically coupled to the terminals of the battery 100 to receive a battery-supply voltage $V_{BAT}$ produced by the battery 100. The battery-supply voltage $V_{BAT}$ can be about 2V to about 4.5V including about 2.5V, about 3V, about 3.5V, about 4V, and/or any voltage or voltage range between any two of the foregoing values. In another embodiment, the battery 100 can be replaced with or can include a DC voltage source.

The first-stage voltage converter 110 is configured to convert the battery-supply voltage $V_{BAT}$ to an intermediate voltage $V_{INT}$ that is lower than the battery-supply voltage $V_{BAT}$. The intermediate voltage $V_{INT}$ can be about 1.1V to about 2V including about 1.25V, about 1.5V, about 1.75V, and/or any voltage or voltage range between any two of the foregoing values. Alternatively, the intermediate voltage $V_{INT}$ can be higher than about 2V or lower than about 1.1V. The output 114 of the first-stage voltage converter 110 is electrically coupled to the input 122 of the second-stage voltage converter 120 to receive the intermediate voltage $V_{INT}$. The second-stage voltage converter 120 is configured to convert the intermediate voltage $V_{INT}$ to a processor-supply voltage $V_{PRO}$ that is usually lower than the intermediate voltage $V_{INT}$. The processor-supply voltage $V_{PRO}$ can be about 0.3V to about 0.9V including about 0.4V, about 0.5V, about 0.6V, about 0.7V, about 0.8V, and/or any voltage or voltage range between any two of the foregoing values. Alternatively, the processor-supply voltage $V_{PRO}$ can be higher than about 0.9V or lower than about 0.3V. In an embodiment, the voltages have the following relationship: $V_{PRO} < V_{INT} < V_{BAT}$. The output 124 of the second-stage voltage converter 120 is electrically coupled to the input 132 of a processor 130 to receive the processor-supply voltage $V_{PRO}$.

The first-stage voltage converter 110 is mounted on and/or electrically coupled to a printed circuit board (PCB) 200. The second-stage voltage converter 120 and the processor 130 are mounted on and/or electrically coupled to a processor package substrate 210. Alternatively, the processor 130 can be contained in a package or die 135, which is mounted on and/or electrically coupled to the processor package substrate 210. In an embodiment, the processor 130 and package 135 can form a system-on-a-chip (SoC). The processor package substrate 210 is mounted on the PCB 200.

Figure 2:
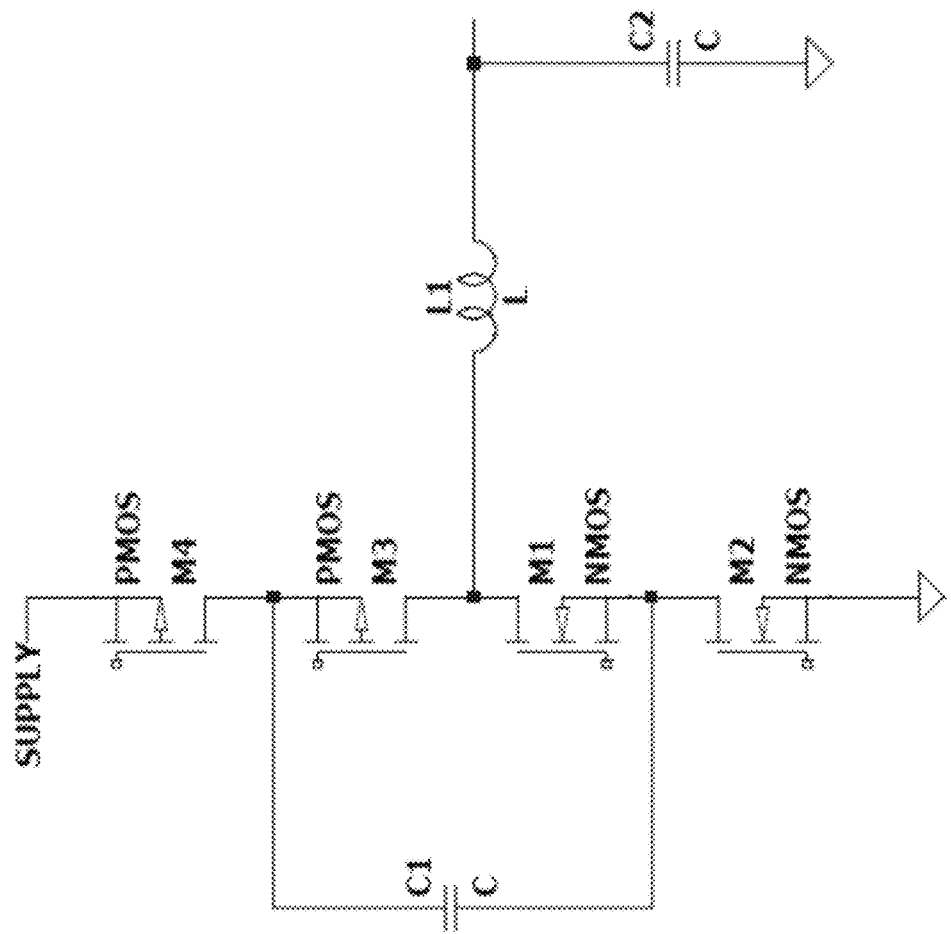
FIG. 2 is a circuit diagram of the output stage of an example three-level voltage converter.

The first-stage and second-stage voltage converters 110, 120 each include input passive electrical components, a voltage converter, and output passive electrical components. The input and output passive electrical components can include one or more capacitors, one or more inductors, and/or one or more resistors. The voltage converters of the first-stage and second-stage voltage converters 110, 120 are preferably three-level voltage converters. For example, the first-stage voltage converter 110 can include a first three-level voltage converter and the second-stage voltage converter 120 includes a second three-level voltage converter. A circuit diagram of the output stage of an example three-level voltage converter 20 is illustrated in FIG. 2.

In some embodiments, the first and/or second three-level voltage converter can be a multi-phase interleaved three-level voltage converter. A multi-phase interleaved three-level voltage converter can create harmonics (e.g., due to switching noise) that may generate a larger or smaller overall voltage ripple. In a preferred embodiment, the first-stage voltage converters 110 comprises a three-level voltage converter with only one phase (i.e., not multi-phase interleaved) and the second-stage voltage converter 120 comprises a two-phase interleaved three-level voltage converter. When the first-stage voltage converters 110 comprises a three-level voltage converter with only one phase, the cost, the number of components/parts, and/or the size of the assembly 10 can be reduced. The voltage ripple created by an underdamped single phase three-level voltage converter, in the first-stage voltage converter 110, can be regulated and/or compensated for by the two-phase interleaved three-level voltage converter in the second-stage voltage converter 120. Each voltage converter 110, 120 can include a local controller for the respective voltage converter 110, 120, which can operate under the control of controller 140, which can be a master controller (e.g., in a master-slave relationship).

Figure 4:
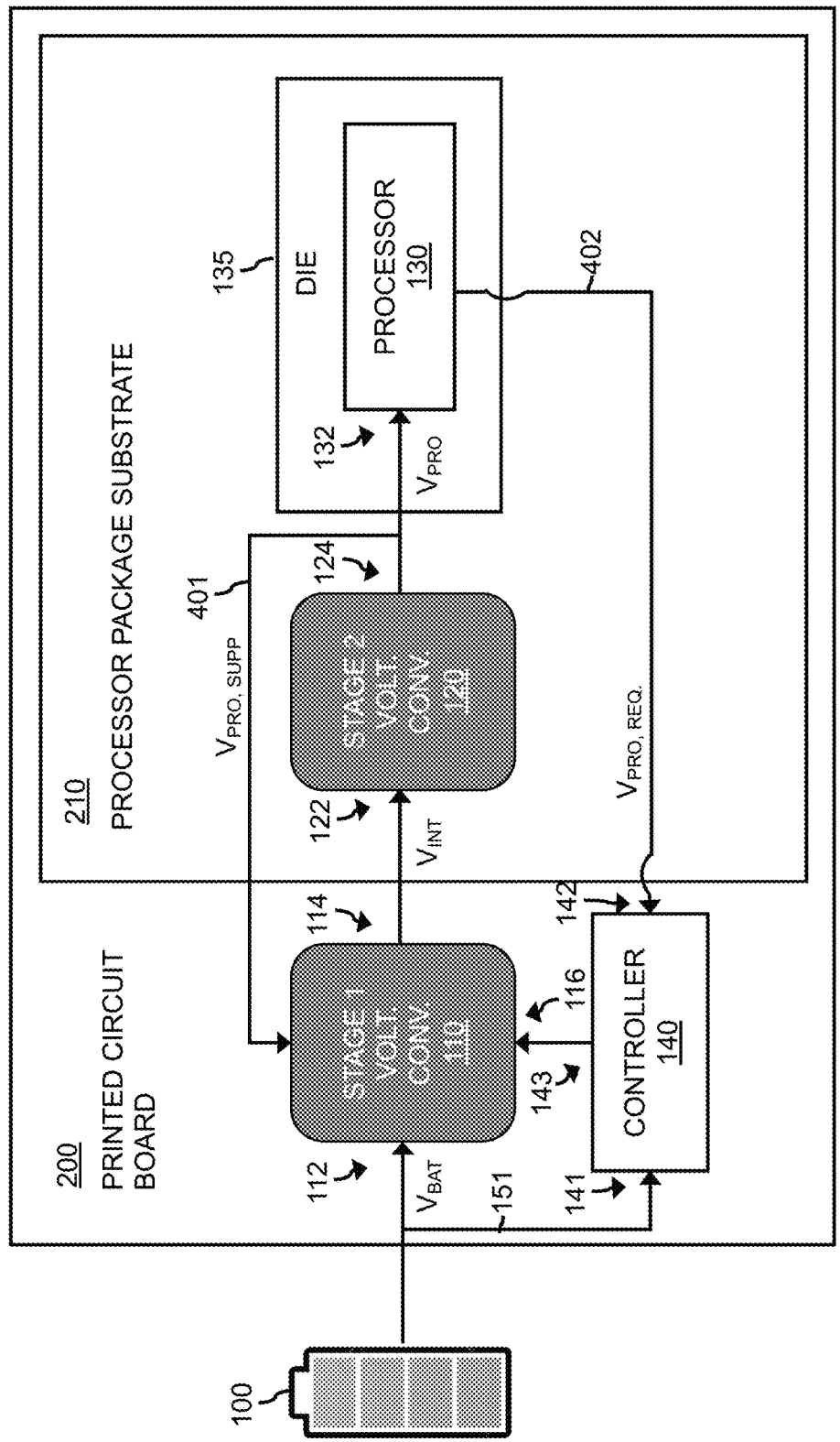

Offset delays can be included in the multi-phase interleaved three-level voltage converter to modulate the frequency content of the switching noise to allow for a lower overall ripple of the processor-supply voltage $V_{PRO}$, such as after the LC filter (e.g., output inductor(s) 711, 712 and output filter capacitor 722 in FIG. 4) at the output of the second-stage voltage converter 120. The higher gain and bandwidth of the second-stage voltage converter 120 can cancel the relatively poor-performance (e.g., large ripple) of the first-stage voltage converter 110, thus allowing a low-cost, low-performance first-stage voltage converter 110 to be used.

In an embodiment, the second-stage voltage converter 120 includes or consists of a switched-capacitor voltage converter and/or a low-dropout (LDO) regulator. The switched-capacitor voltage converter or LDO regulator can have a fixed voltage-conversion ratio, such as a passive divide-by-two conversion ratio or another voltage-conversion ratio. An LDO regulator is generally less expensive and smaller than a switched-capacitor voltage converter and can be used if the required power is very low since overall efficiency is only impacted minimally. Additionally or alternatively, the switched-capacitor voltage converter can operate at a fixed frequency that can be locked to (e.g., at a fixed ratio of) the operating frequency of the first-stage voltage converter 110. In an alternative embodiment, the second-stage voltage converter 120 includes or consists of a Buck-boost voltage converter, in which case $V_{INT}$ may be lower, equal to, or greater than $V_{PRO}$. For example, a Buck-boost voltage converter can be used when the battery-supply voltage $V_{BAT}$ is lower than the processor-supply voltage $V_{PRO}$.

The clocks for the first-stage voltage converter 110 and for second-stage voltage converter 120 can be common (e.g., using a digital divider), which allows the switching noise to be correlated between the first and second stage voltage converters 110, 120. Alternatively, the clocks can be separately produced using one or more PLL frequency synthesizer(s), which allows a phase offset to be inserted (e.g., using the controller 140) between the two operating frequencies to reduce the switching noise produced by the first and second stage voltage converters 110, 120 thereby reducing and/or minimizing ripple and other noise in the processor-supply voltage $V_{PRO}$.

A controller 140 (e.g., a master controller) has a first input 141 that is electrically coupled to the battery 100 and/or to the input 112 of the first-stage voltage converter 110 (e.g., via a first feedback line 151) to receive the battery-supply voltage $V_{BAT}$. The controller has a second input 142 that is electrically coupled to an output of the processor 130 (e.g., via a second feedback line 152) to receive a signal that corresponds to the requested voltage of the processor 130, which can vary with respect to time. The controller 140 has an output 143 that is electrically coupled to the first-stage voltage converter 110, such as to a second input 116 of the first-stage voltage converter 110. The controller 140 is configured to produce an output signal that is sent to the second input 116 of the first-stage voltage converter 110 that causes the first-stage voltage converter 110 to adjust the intermediate voltage $V_{INT}$. The intermediate voltage $V_{INT}$ can be adjusted to maximize the voltage conversion efficiency of the assembly 10 and/or to reduce a ripple (e.g., variation and/or noise) in the processor-supply voltage $V_{PRO}$. Ripple can be measured using a root-mean-squared (RMS) measurement or a peak-to-peak measurement of the relevant voltage (e.g., intermediate voltage $V_{INT}$ or processor-supply voltage $V_{PRO}$).

The master controller 140 can set the intermediate voltage $V_{INT}$ using open-loop or closed-loop feedback. In open-loop feedback, the controller 140 produces the output signal based on the inputs of the battery-supply voltage $V_{BAT}$ and the requested voltage of the processor 130 without any feedback on the actual intermediate voltage $V_{INT}$ and/or the actual processor-supply voltage $V_{PRO}$ produced. For example, the controller 140 can produce the output signal using a look-up table, a mathematical model, or another open-loop feedback mechanism. In closed loop feedback, the controller 140 can receive a feedback signal that includes the intermediate voltage $V_{INT}$ (e.g., from a feedback line electrically coupled to the output 114 of the first-stage voltage converter 110) and/or that includes the processor-supply voltage $V_{PRO}$ (e.g., from a feedback line electrically coupled to the output 124 of the second-stage voltage converter 120), and the controller 140 can produce the output signal using the inputs of the battery-supply voltage $V_{BAT}$, the requested voltage of the processor 130, the actual intermediate voltage $V_{INT}$, and/or the actual processor-supply voltage $V_{PRO}$.

In some embodiments, the master controller 140 can be integrated into the same device as and/or into a common housing with the first-stage voltage converter 110, the second-stage voltage converter 120, and/or the processor 130. Integrating the controller 140 into the processor 130 can have the benefit of using more advanced and efficient technologies, thus allowing the controller 140 to be smaller and less expensive. However, when the controller 140 is integrated into the processor 130, the controller 140 is temporarily offline during startup (e.g., when power is first applied), in which case the first and second stage voltage converters 110, 120 can operate in a predefined default open-loop safe mode until the controller 140 is powered up and online. In one example, the second-stage voltage converter 120 can include an LDO that is temporarily used only during the predefined default open-loop safe mode. The LDO can be placed offline (e.g., turned off) when the controller 140 is powered up and online.

Figure 3:
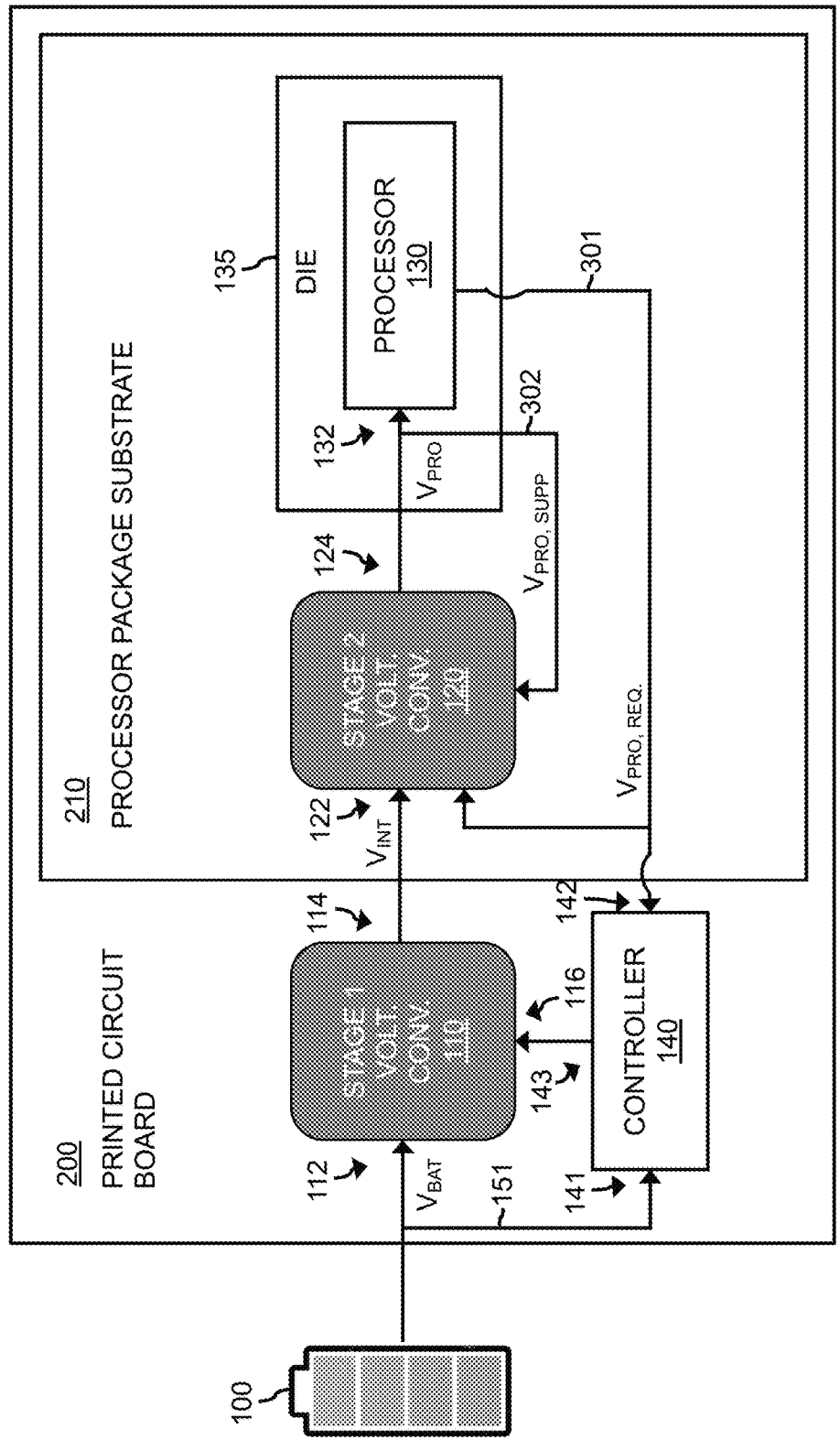
FIGS. 3-5 are block diagrams of an assembly according to different embodiments.

FIG. 3 is a block diagram of an assembly 30 according to another embodiment. Assembly 30 is the same as assembly 10 except as described below. In assembly 30, the first and second stage voltage converters 110, 120 are or include three-level voltage converters. Feedback lines 301, 302 to regulate the processor-supply voltage $V_{PRO}$ are electrically coupled to the second-stage voltage converter 120. Analog feedback line 301 carries the processor-supply voltage supplied to the processor 130, $V_{PRO,SUPP}$ Digital or analog feedback line 302 carries the processor-supply voltage requested by the processor 130, $V_{PRO,REQ}$.

FIG. 4 is a block diagram of an assembly 40 according to another embodiment. Assembly 40 is the same as assembly 10 except as described below. In assembly 40, the first-stage voltage converter 110 is or includes a three-level voltage converter and the second-stage voltage converter 120 is or includes a switched-capacitor voltage converter and/or an LDO. Feedback lines 401, 402 to regulate the processor-supply voltage $V_{PRO}$ are electrically coupled to the first-stage voltage converter 110 and to the master controller 140, respectively. Analog feedback line 401 carries, to the first-stage voltage converter 110, the processor-supply voltage supplied to the processor 130, $V_{PRO,SUPP}$ Digital or analog feedback line 402 carries, to the controller 140, the processor-supply voltage requested by the processor 130, $V_{PRO,REQ}$. Since the switched-capacitor voltage converter and/or LDO in the second-stage voltage converter 120 has a fixed-voltage ratio, the first-stage voltage converter 110 can control the processor-supply voltage $V_{PRO}$.

Figure 5:
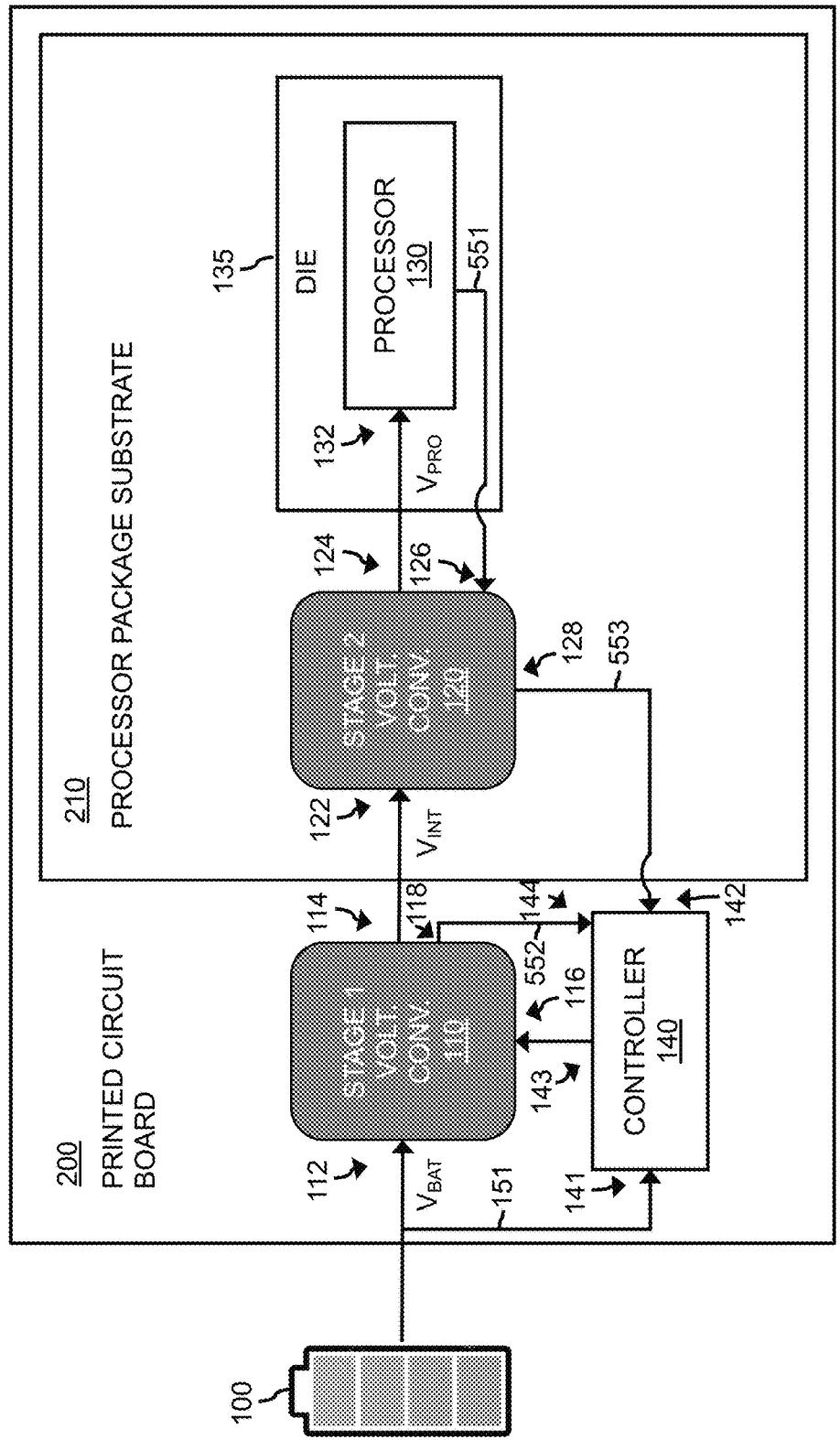

FIG. 5 is a block diagram of an assembly 50 according to another embodiment. Assembly 50 is the same as assembly 10 except as described below. In assembly 50, feedback line 551 electrically couples the output of the processor 130 to a second input 126 of the second-stage voltage converter 120 to provide a signal to the second-stage voltage converter 120 that corresponds to the requested voltage of the processor 130 and/or the actual processor-supply voltage $V_{PRO}$. Feedback line 552 electrically couples an input 144 of the controller 140 to an output 118 of the first-stage voltage converter 110 so that the controller 140 can monitor the intermediate voltage $V_{INT}$, the ripple of the intermediate voltage $V_{INT}$, and/or the duty cycle of the first-stage voltage converter 110. Feedback line 553 electrically couples the controller 140 to an output 128 of the second-stage voltage converter 120 so that the controller 140 can monitor the requested voltage of the processor 130, the processor-supply voltage $V_{PRO}$, the ripple of the processor-supply voltage $V_{PRO}$, and/or the duty cycle of the second-stage voltage converter 120. In another embodiment, feedback line 551 electrically couples the output of the processor 130 to an input of the controller 140.

In one embodiment of assemblies 10, 30, 40, 50, the master controller 140 can be configured to send a control signal to the first-stage voltage converter 110 (e.g., via output 143 and input 116), such as to the local controller of the first-stage voltage converter 110, that causes the first-stage voltage converter 110 to vary (e.g., sweep) the intermediate voltage $V_{INT}$ over a predetermined range (e.g., from about 1.75V to about 1.85V) while monitoring the duty cycles of the first-stage and second-stage voltage converters 110, 120. The duty cycle of the first-stage voltage converter 110 determines the intermediate voltage $V_{INT}$. The duty cycle of the second-stage voltage converter 120 determines the processor-supply voltage $V_{PRO}$. The controller 140 can be configured to determine an optimal intermediate voltage $V_{INT,OPT\_EFF}$ at which the duty cycles of the first-stage and second-stage voltage converters 110, 120 are minimized, which can maximize the voltage conversion efficiency of the assembly 30. When the controller 140 determines the optimal intermediate voltage $V_O$, the controller can set the duty cycle of the first-stage voltage converter 110 such that the first-stage voltage converter 110 produces the optimal intermediate voltage $V_{INT,OPT\_EFF}$ and/or can set the intermediate voltage $V_{INT}$ to the optimal intermediate voltage $V_{INT,OPT\_EFF}$. In either case, when the first-stage voltage converter 110 produces the optimal intermediate voltage $V_{INT,OPT\_EFF}$, the duty cycles of the first-stage and second-stage voltage converters 110, 120 are minimized and co-optimized for maximizing voltage conversion efficiency.

In some embodiments, the controller 140 can be configured to select an optimal intermediate voltage $V_{INT,OPT\_EFF}$ at which the duty cycle(s) of the first-stage and/or second-stage voltage converters 110, 120 is/are not equal to 50%, which generally has a poor control performance (settling time, etc.) for three-level voltage converters and/or poor voltage regulation (e.g., large voltage ripple). In some embodiments, the preferred duty cycle(s) of the first-stage and/or second-stage voltage converters 110, 120 can be in a range of about 0.1 to about 0.4 and/or in a range of about 0.6 to about 0.9. As used herein, "about" means plus or minus 5% of the relevant value. When the second-stage voltage converter 120 is a two-phase interleaved three-level voltage converter, the controller 140 preferably sets the duty cycle of each phase to 25% or 75%, which theoretically produces a processor-supply voltage $V_{PRO}$ having zero (or minimal) ripple.

Figure 6:
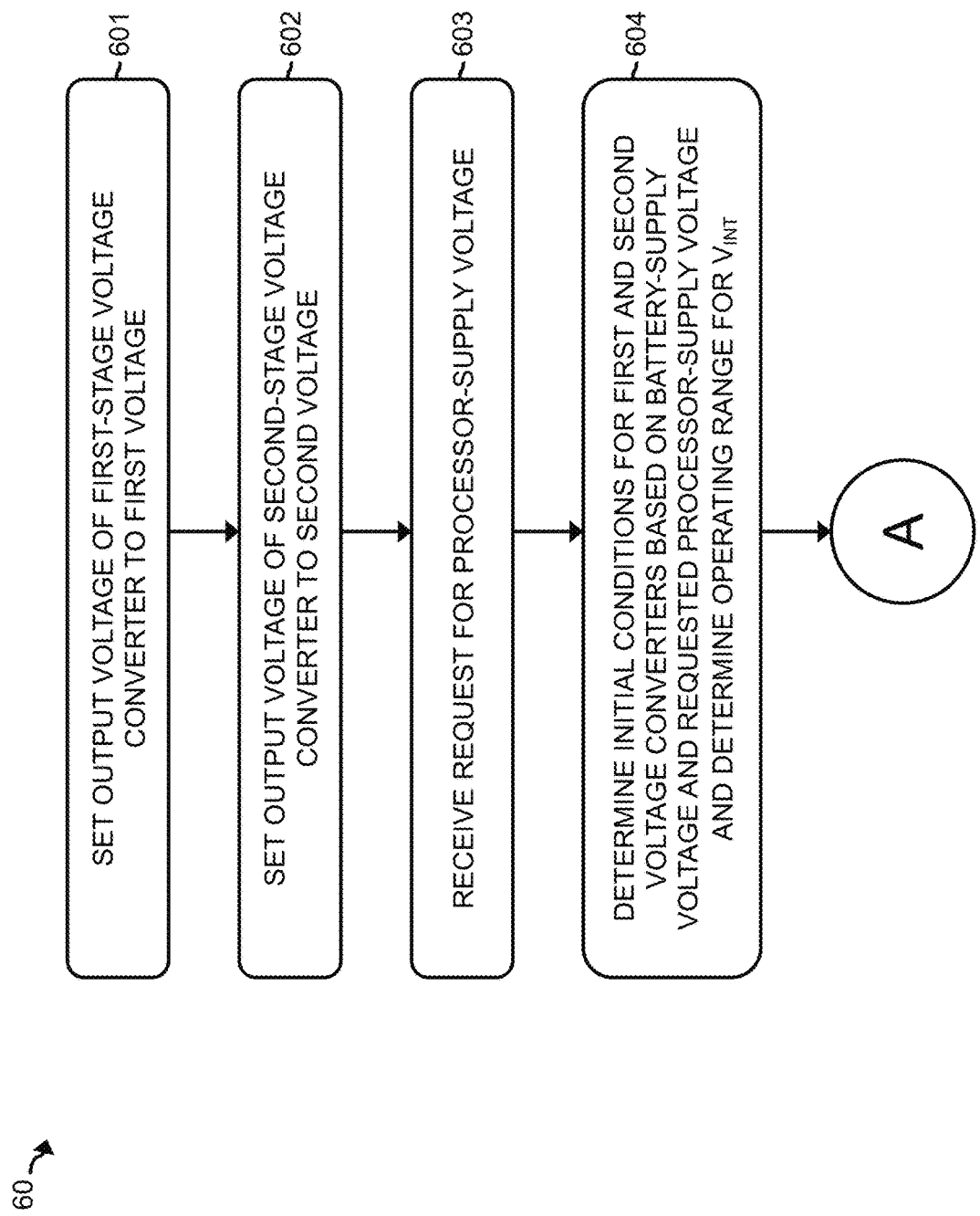
FIG. 6 is a flow chart of a method for determining an optimally-efficient duty cycle for the first-stage voltage converter according to an embodiment.
Figure 6:
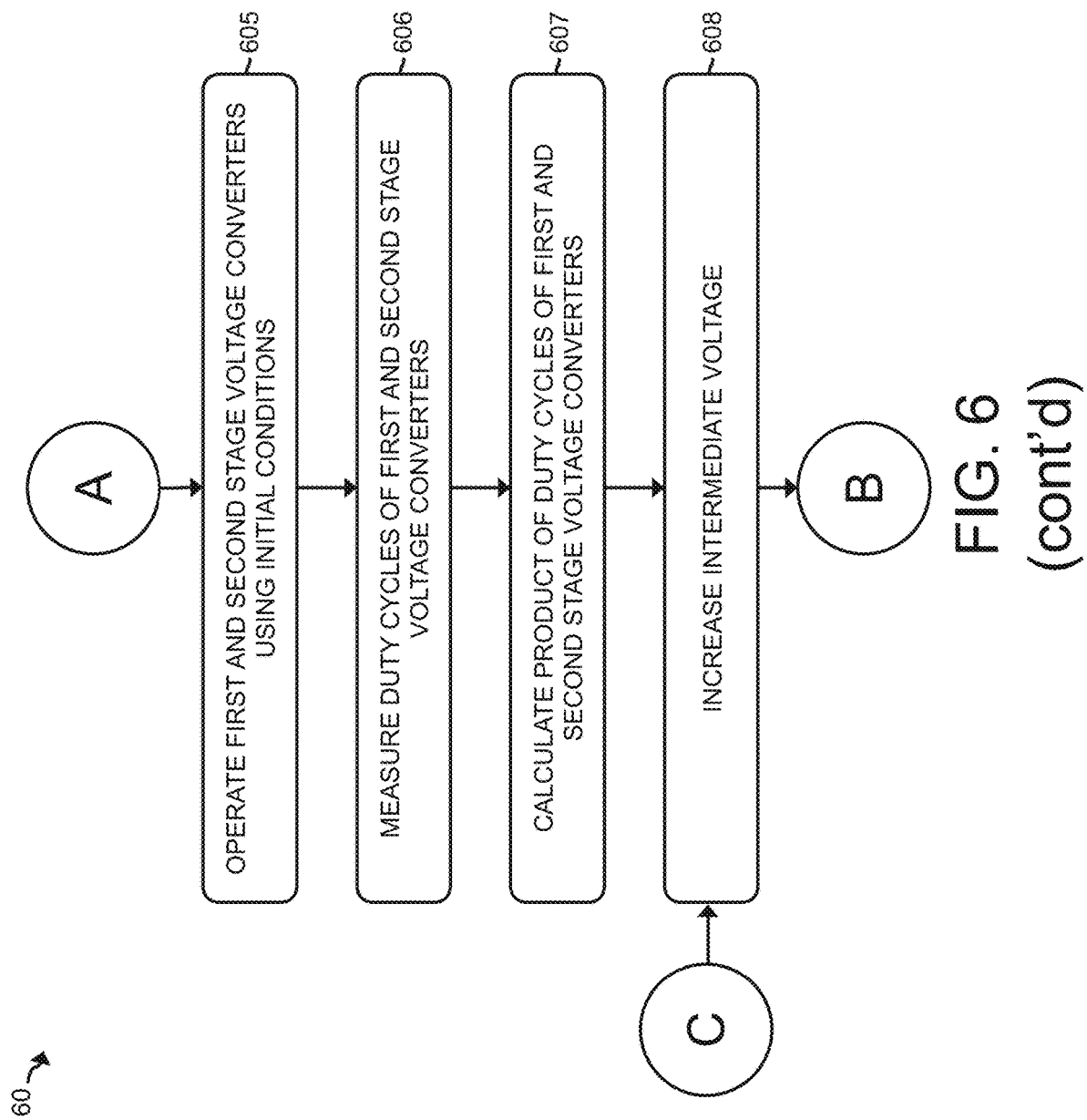
Figure 6:
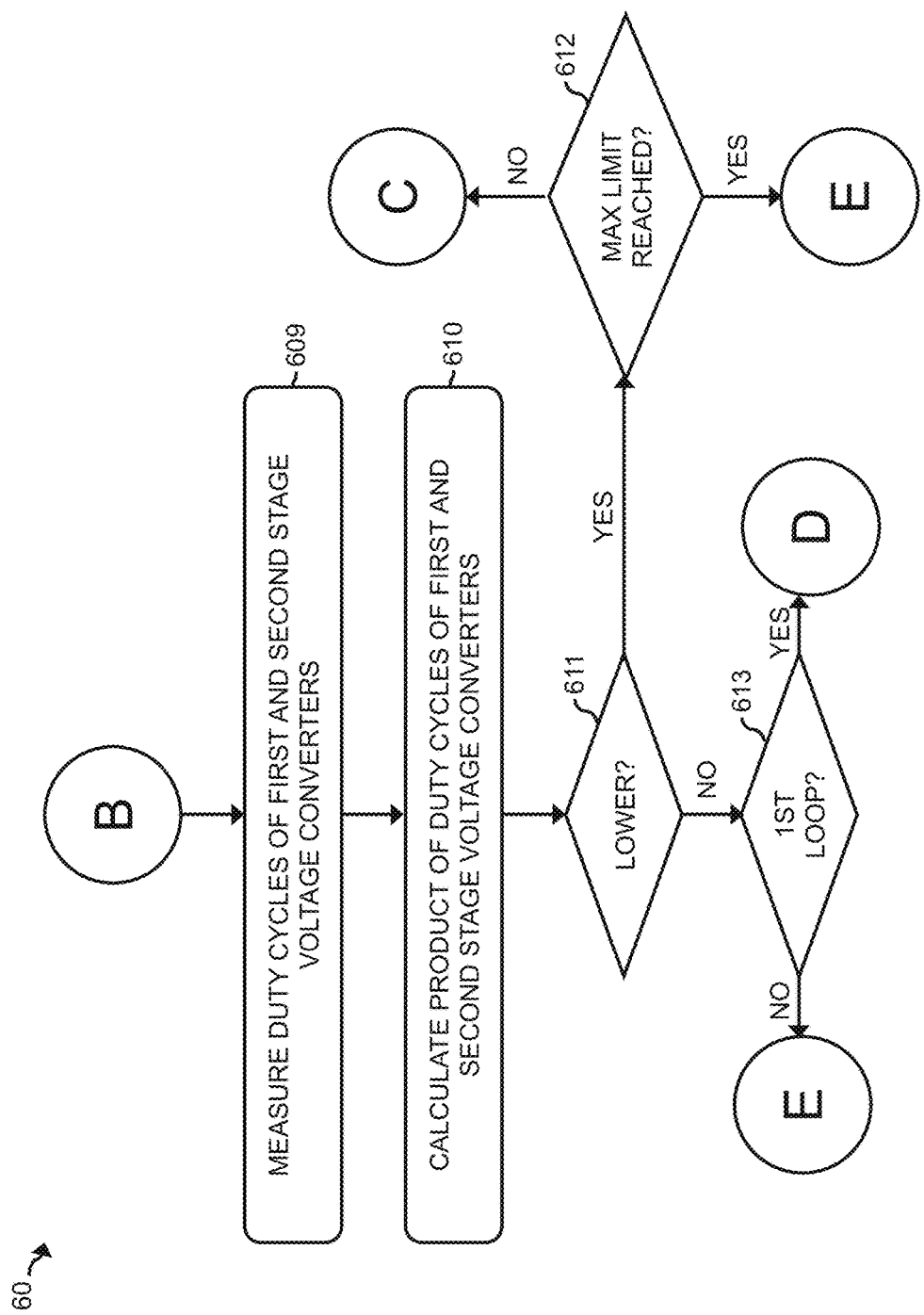
Figure 6:
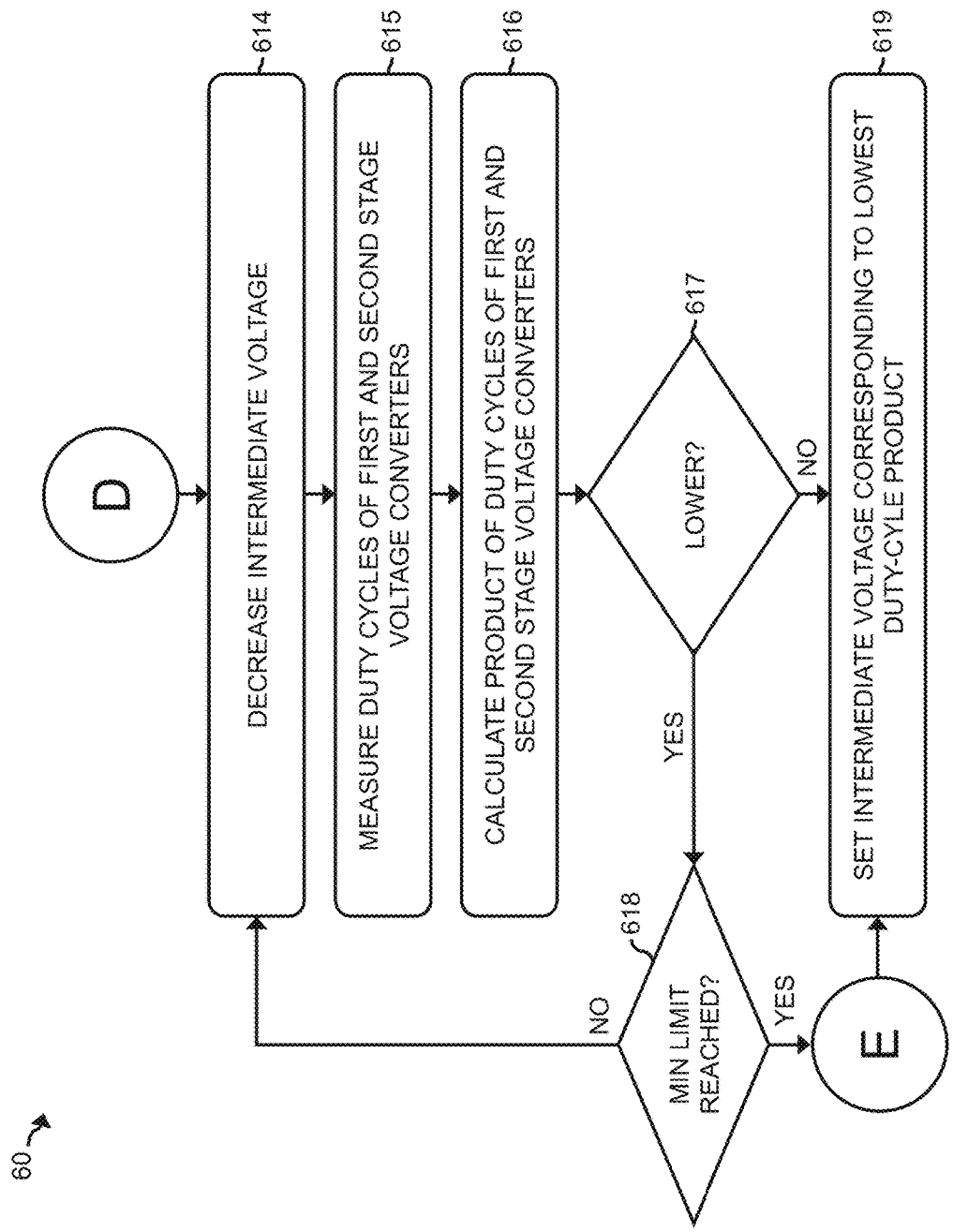

FIG. 6 is a flow chart of a method 60 for determining an optimally-efficient duty cycle for the first-stage voltage converter 110 according to an embodiment. Method 60 can be performed at start-up of the assembly (e.g., assembly 10, 30, 40, 50) or during operation of the assembly. In step 601, the output voltage (e.g., the intermediate voltage $V_{INT}$) of the first-stage voltage converter 110 is ramped up to and/or set at a first voltage, which can be a nominal voltage of about 1.5V or another voltage. In step 602, the output voltage (e.g., the processor-supply voltage $V_{PRO}$) of the second-stage voltage converter 120 is ramped up and/or set to a second voltage, which can be a nominal voltage of about 0.6V or another voltage. In step 603, the controller 140 receives a request from the processor 130 for a certain processor-supply voltage (e.g., the requested processor-supply voltage $V_{PRO,REQ}$) such as about 0.7V or another voltage.

In step 604, the master controller 140 determines initial operating conditions for the first and second stage voltage converters 110, 120 based on the requested processor-supply voltage $V_{PRO,REQ}$ and the battery-supply voltage $V_{BAT}$. For example, the controller 140 can determine that the intermediate voltage $V_{INT}$ should be initially set at 1V for a $V_{PRO,REQ}$ of about 0.7V and a $V_{BAT}$ of about 3.7V. The controller 140 can use a look-up table or a mathematical model to determine the initial intermediate voltage $V_{INT}$ setting. The controller 140 can convert the initial intermediate voltage $V_{INT}$ setting to a duty-cycle setting for the first-stage voltage converter 110. During step 604 the controller 140 also determines the voltage range (i.e., minimum and maximum voltages $V_{MIN}$ and $V_{MAX}$, respectively) that can be allowed for $V_{INT}$, based on the maximum and minimum voltage required by the second stage voltage converter 120, the battery-supply voltage $V_{BAT}$, the requested processor-supply voltage VFW), REQ, and the need to avoid operating in the proximity of duty cycle(s) that have poor performance. The controller 140 can use a look-up table or a mathematical model to determine the minimum and maximum voltage ranges that can be allowed for $V_{INT}$.

In step 605 (via placeholder A), the master controller 140 sends control signals that cause the first and second stage voltage converters 110, 120 to operate at the initial operating conditions determined in step 604. In step 606, the first and second duty cycles of the first and second stage voltage converters 110, 120, respectively, are measured or determined. For example, the assembly 10, 30, 40, 50 can include one or more digital delay locked loops (DLL) that can allow the accurate measurement of the duty cycles of the first and second stage voltage converters 110, 120. In step 607, the controller 140 calculates the product of the first and second duty cycles measured in step 606, which are stored in memory operatively coupled to the controller 140.

In step 608, the master controller 140 sends one or more control signals that cause the intermediate voltage $V_{INT}$ to be increased, such as by increasing the duty cycle of the first-stage voltage converter 110. The intermediate voltage $V_{INT}$ can be increased on a percentage basis (e.g., within a range of 5% to 15% of the initial intermediate voltage) or an absolute basis (e.g., within a predetermined intermediate voltage range such as about 0.05V to about 0.15V). In step 609 (via placeholder B), the first and second duty cycles are measured or determined, in the same manner as in step 606, for the increased intermediate-voltage setting. In step 610, the controller 140 calculates the product of the first and second duty cycles measured in step 609, which are stored in memory operatively coupled to the controller 140.

In step 611, the master controller 140 compares the product of the first and second duty cycles determined in step 610 (e.g., with the increased intermediate voltage) with the product of the first and second duty cycles determined in step 607 (e.g., with the initial conditions). If the product of the first and second duty cycles determined in step 610 is lower than the product of the first and second duty cycles determined in step 607 (i.e., step 611=yes) and the intermediate voltage $V_{INT}$ has not reached the maximum voltage $V_{MAX}$ (i.e., step 612=no), the method 60 returns in a loop to step 608 (via placeholder C) to increase the intermediate voltage a second time. This loop continues until the intermediate voltage $V_{INT}$ reaches the maximum voltage $V_{MAX}$ (i.e., step 612=yes) or the product of the first and second duty cycles in the current iteration through the loop is greater than or equal to the product of the first and second duty cycles in the immediately-prior iteration through the loop (i.e., step 611=no). If the intermediate voltage $V_{INT}$ has reached the maximum voltage $V_{MAX}$ (i.e., step 612=yes), then the method 60 proceeds to step 619 (via placeholder E). If the product of the first and second duty cycles in the current iteration through the loop is greater than or equal to the product of the first and second duty cycles in the immediately-prior iteration through the loop (i.e., step 611=no), then the method 60 proceeds to step 613.

Step 613 can also be reached without returning to step 608 when the product of the first and second duty cycles determined in step 610 (e.g., with the increased intermediate voltage) is greater than or equal to the product of the first and second duty cycles determined in step 607 (e.g., with the initial conditions).

In step 613, the master controller 140 determines whether step 611 was reached in the first time through the loop. If so, the method 60 proceeds to step 614 (via placeholder D). If not, the method 60 proceeds to step 619 (via placeholder E). In step 614, the controller 140 sends one or more control signals that cause the intermediate voltage $V_{INT}$ to be decreased, such as by decreasing the duty cycle of the first-stage voltage converter 110. The intermediate voltage $V_{INT}$ can be decreased on a percentage basis (e.g., within a range of 5% to 15% of the initial intermediate voltage) or an absolute basis (e.g., within a predetermined intermediate voltage range such as about 0.05V to about 0.15V). In step 615, the first and second duty cycles are measured or determined, in the same manner as in step 606, for the decreased intermediate-voltage setting. In step 616, the controller 140 calculates the product of the first and second duty cycles measured in step 615, which are stored in memory operatively coupled to the controller 140. In step 617, the controller compares the product of the first and second duty cycles determined in step 616 (e.g., with the decreased intermediate voltage) with the product of the first and second duty cycles determined in step 607 (e.g., with the initial conditions). If the product of the first and second duty cycles determined in step 616 is lower than the product of the first and second duty cycles determined in step 607 (i.e., step 617=yes) and the intermediate voltage $V_{INT}$ has not reached the minimum voltage $V_{MIN}$ (i.e., step 618=no), the method 60 returns in a loop to step 614 to decrease the intermediate voltage a second time. This loop continues until the intermediate voltage $V_{INT}$ has reached the minimum voltage $V_{MIN}$ (i.e., step 618=yes) or the product of the first and second duty cycles in the current iteration through the loop is greater than or equal to the product of the first and second duty cycles in the immediately-prior iteration through the loop (i.e., step 617=no). If the intermediate voltage $V_{INT}$ has reached the minimum voltage $V_{MIN}$ (i.e., step 618=yes), then the method 60 proceeds to step 619 (via placeholder E). If the product of the first and second duty cycles in the current iteration through the loop is greater than or equal to the product of the first and second duty cycles in the immediately-prior iteration through the loop (i.e., step 617=no), then the method 60 proceeds to step 619.

Step 619 can also be reached without returning to step 614 when the product of the first and second duty cycles determined in step 616 (e.g., with the decreased intermediate voltage) is greater than or equal to the product of the first and second duty cycles determined in step 607 (e.g., with the initial conditions). Reaching step 619 after step 617 without proceeding through at least one loop back to step 614 should only occur when the initial conditions determined in step 604 are the optimally-efficient conditions. In step 619, the controller 140 sets the intermediate voltage (e.g., by setting the duty cycle of the first-stage voltage converter 110) that corresponds to the lowest product of the first and second duty cycles determined in steps 607, 610, and/or 616.

In another embodiment, the method 60 can be performed by first decreasing the intermediate voltage $V_{INT}$ (in step 614) from the initial conditions to determine if an optimally-efficient duty cycle for the first-stage voltage converter 110 exists. If an optimally-efficient duty cycle for the first-stage voltage converter 110 does not exist (e.g., step 617=no), then the method 60 can then proceed to step 608 to increase the intermediate voltage $V_{INT}$ from the initial conditions. If an optimally-efficient duty cycle for the first-stage voltage converter 110 exists (e.g., step 611=yes) or the initial conditions are the optimally-efficient conditions (e.g., step 611=no), in step 619 the controller 140 sets the intermediate voltage (e.g., by setting the duty cycle of the first-stage voltage converter 110) that corresponds to the lowest product of the first and second duty cycles determined in steps 607, 610, and/or 616.

Returning to FIG. 5, in another embodiment, the master controller 140 can be configured to send a control signal to the first-stage voltage converter 110 (e.g., via output 143 and input 116) that causes the first-stage voltage converter 110 to vary (e.g., sweep) the intermediate voltage $V_{INT}$ over a predetermined range (e.g., from about 1.75V to about 1.85V) while monitoring the ripple of the processor-supply voltage $V_{PRO}$. The ripple of the processor-supply voltage $V_{PRO}$ can be measured using a peak-to-peak or an RMS measurement using a voltage sensor. The controller 140 can be configured to determine an optimal intermediate voltage $V_{INT,OPT\_RIP}$ at which the ripple of the processor-supply voltage $V_{PRO}$ is minimized. When the controller 140 determines the optimal intermediate voltage $V_{INT,OPT\_RIP}$, the controller can set the duty cycle of the first-stage voltage converter 110 such that the first-stage voltage converter 110 produces the optimal intermediate voltage $V_{INT,OPT\_RIP}$ and/or can set the intermediate voltage $V_{INT}$ to the optimal intermediate voltage $V_{INT,OPT\_RIP}$. In either case, when the first-stage voltage converter 110 produces the optimal intermediate voltage $V_{INT,OPT\_RIP}$, the ripple of the processor-supply voltage $V_{PRO}$ is minimized.

Figure 7:
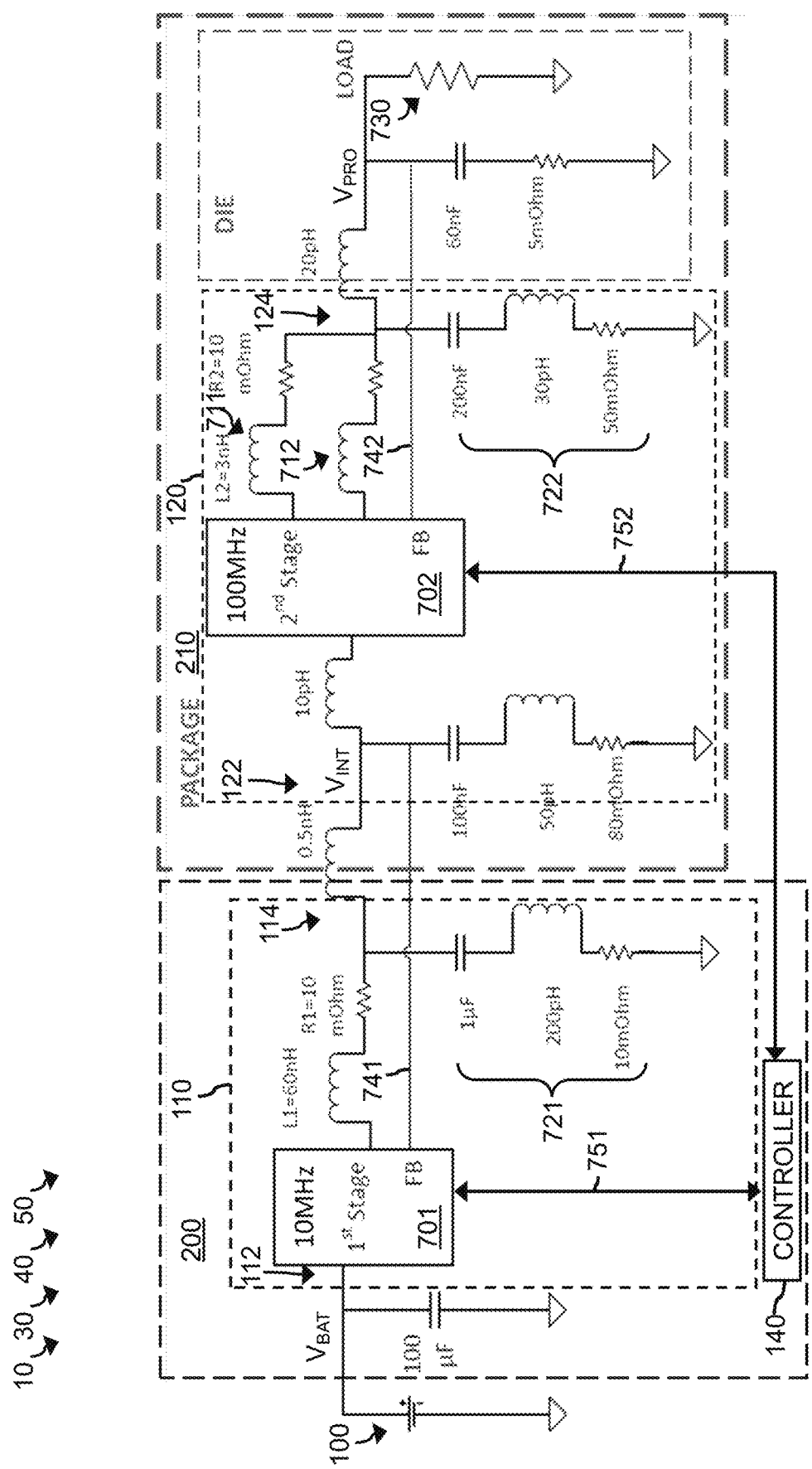
FIG. 7 is an example circuit diagram of the voltage-control circuitry in assemblies illustrated in FIGS. 1-5.

FIG. 7 is an example circuit diagram of the voltage-control circuitry in assemblies 10 and 30 (in general, assembly 10). The circuit diagram illustrates that the first-stage and second-stage voltage converters 110, 120 include first and second voltage converters 701, 702, respectively. The second voltage converter 702 is illustrated as having 2 sets 711, 712 of output inductors and parasitic resistors (e.g., the equivalent-series resistance (ESR) of the output inductors) in the embodiment in which the second voltage converter 702 has two phases. Set 712 (or set 711) can be removed when the second voltage converter 702 only has one phase. Additional sets 711 and/or 712 can be added when the second voltage converter 702 includes additional phases. In addition, the circuit diagram illustrates the processor 130 conceptually as a load resistor 730.

Each voltage converter stage 110, 120 includes a plurality of passive electrical components such as capacitors, inductors, and resistors which can have the example values illustrated in FIG. 7 or other values. For example, the first-stage and second-stage voltage converters 110, 120 include first and second output filter capacitors 721, 722, respectively, which are here shown including their respective parasitic elements. The first output filter capacitor 721 is generally sized to be larger than the second output filter capacitor 722 because it is assumed that the second stage operates at a higher frequency. For example, the first output filter capacitor 721 is a 1 µF capacitor, with an associated 200 pH parasitic inductor and a 10 mOhm parasitic resistor. In contrast, the second output filter capacitor 722 is a 200 nF capacitor, with a 30 pH parasitic inductor and a 50 mOhm parasitic resistor. In other embodiments, the first and output filter capacitors 721, 722 can be sized differently.

The relatively small size of the first output filter capacitor 721 relative to its operating frequency is enabled, at least in part, due to the difference in operating frequency or bandwidth of the first and second voltage converters 701, 702. For example, the first voltage converter 701 has an operating frequency of 10 MHz while the second voltage converter 702 has an operating frequency of 100 MHz. Thus, the second voltage converter 702 has an operating frequency that is 10 times higher than the operating frequency of the first voltage converter 701. In other embodiments, the second voltage converter 702 can have an operating frequency that is 8-25 times higher than, and a harmonic of, the operating frequency of the first voltage converter 701. The higher operating frequency of the second voltage converter 702 allows the second voltage converter 702 to compensate for inaccuracies and/or fluctuation (e.g., ripple) in the output voltage (the intermediate voltage $V_{INT}$) of the first voltage converter 701, which can be caused by the lower operating frequency of the first voltage converter 701 and/or by the relatively small size of the first output filter capacitor 721.

FIG. 7 also illustrates that the first and second voltage converters 701, 702 include respective feedback lines 741, 742 to receive the actual intermediate voltage $V_{INT}$ and processor-supply voltage $V_{PRO}$, respectively, as feedback. The first and second voltage converters 701, 702 and/or the controller 140 can be configured to adjust the intermediate voltage $V_{INT}$ and processor-supply voltage $V_{PRO}$ based on the respective feedback voltages.

The controller 140 is conceptually illustrated separately from the first and second stage voltage controllers 110, 120 in FIG. 7. However, the controller 140 is preferably integrated into the first-stage voltage converter 110, into the second-stage voltage converter 120, and/or into the processor (e.g., processor 130). In this conceptual illustration, line or bus 751 electrically couples an input of the controller 140 to the first voltage converter 701 so that the controller 140 can monitor the intermediate voltage $V_{INT}$, the ripple of the intermediate voltage $V_{INT}$, the duty cycle of the first voltage converter 701, and/or the battery-supply voltage $V_{BAT}$. Line or bus 752 electrically couples an input of the controller 140 to the second voltage converter 702 so that the controller 140 can monitor the requested voltage of the processor 130, the processor-supply voltage $V_{PRO}$, the ripple of the processor-supply voltage $V_{PRO}$, and/or the duty cycle of the second voltage converter 702.

In addition, the controller 140 can send control signals to the first and/or second voltage controllers 701, 702 over the lines/busses 751, 752, respectively (e.g., as discussed above). For example, the controller 140 can send a control signal to the first voltage converter 701 that causes the first voltage converter 701 to vary (e.g., sweep) the intermediate voltage $V_{INT}$ over a predetermined range (e.g., from about 1.75V to about 1.85V) while the controller 140 monitors the duty cycles of the first and second voltage converters 701, 702 to determine an optimal intermediate voltage $V_{INT,OPT\_EFF}$ at which the duty cycles of the first and second voltage converters 701, 702 are minimized, which can maximize the voltage conversion efficiency of the assembly 10. In another embodiment, the controller 140 can be configured to send a control signal to the first voltage converter 701 that causes the first voltage converter 701 to vary (e.g., sweep) the intermediate voltage $V_{INT}$ over a predetermined range (e.g., from about 1.75V to about 1.85V) while the controller 140 monitors the ripple of the processor-supply voltage $V_{PRO}$. The controller 140 can be configured to determine an optimal intermediate voltage $V_{INT,OPT\_RIP}$ at which the ripple of the processor-supply voltage $V_{PRO}$ is minimized. The controller 140 can cause the first voltage converter 701 to vary or sweep the intermediate voltage $V_{INT}$ over a predetermined range by sending a control signal that causes the first voltage converter 701 to change its duty cycle or by providing a reference voltage to the first voltage converter 701 that is equal to the desired $V_{INT}$. Several reference voltages can be sequentially output from the controller 140 to vary or sweep the intermediate voltage $V_{INT}$ over a predetermined range.

The clocks for the first-stage voltage converter 110 and for second-stage voltage converter 120 can be common (e.g., using a digital divider), which allows the switching noise to be correlated between the first and second stage voltage converters 110, 120. Alternatively, the clocks can be separately produced using one or more PLL frequency synthesizer(s), which allows a phase offset to be inserted (e.g., using the controller 140) between the two operating frequencies to reduce the switching noise produced by the first and second stage voltage converters 110, 120 thereby reducing and/or minimizing ripple and other noise in the processor-supply voltage $V_{PRO}$.

Figure 8:
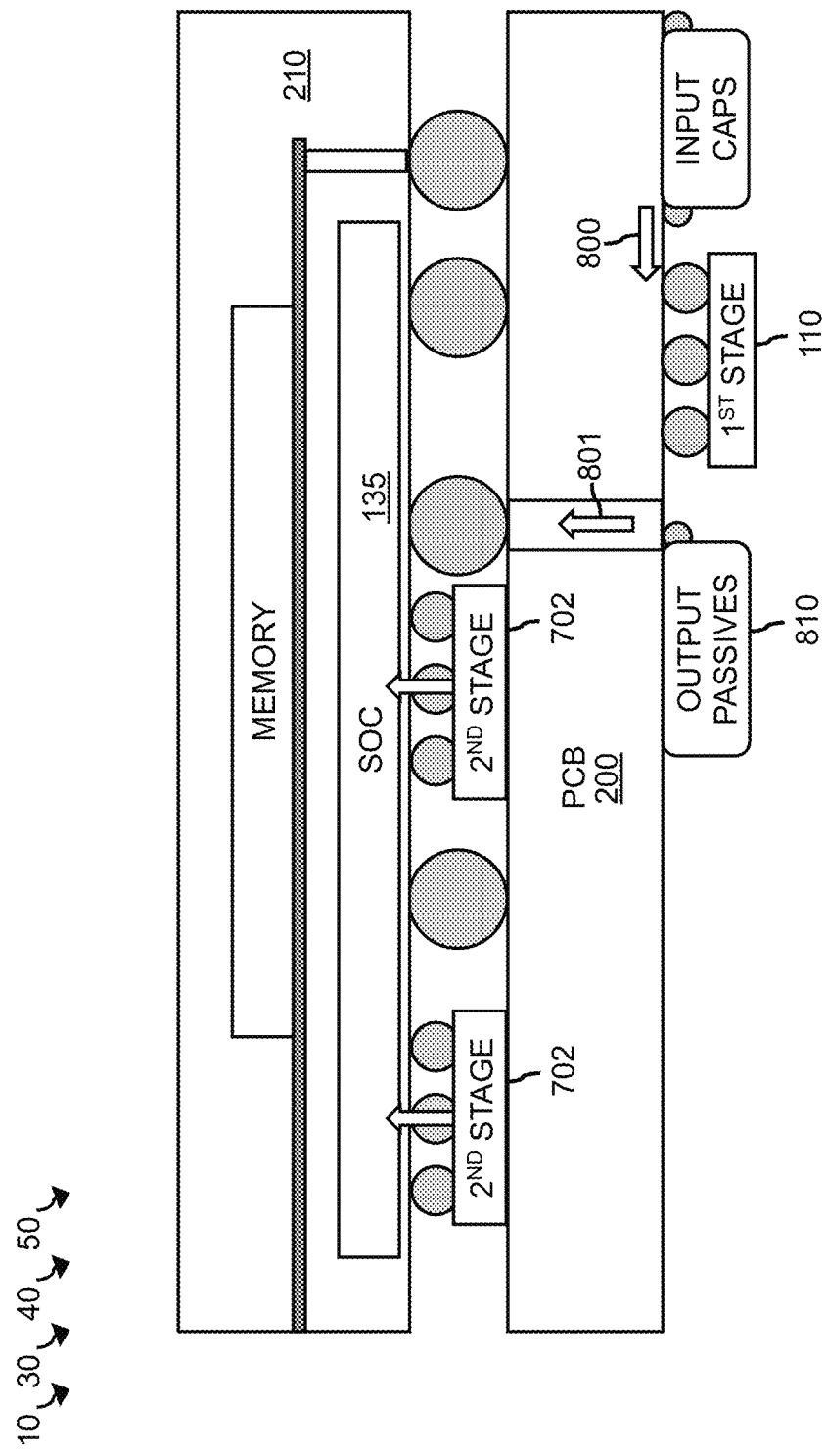
FIG. 8 is an example cross-sectional illustration of the assemblies illustrated in FIGS. 1-5.

FIG. 8 is an example cross-sectional illustration of assembly 10, 30, 40, 50 to illustrate the packaging integration and current flow (as indicated in arrows 800 and 801). Two or more second-stage voltage converters 702 can be included to provide two or more independent voltage supplies to different portions (e.g., cores) in the processor 130 and/or package 135 (e.g., SOC). In this embodiment, the controller 140 is integrated into the same device as and/or into a common housing with the first-stage voltage converter 110, the second-stage voltage converter 120, and/or the processor 130, and therefore the controller 140 is not illustrated in FIG. 8. The output passive electrical components 810 can be the same as the first output filter capacitors 721.

Figure 9:
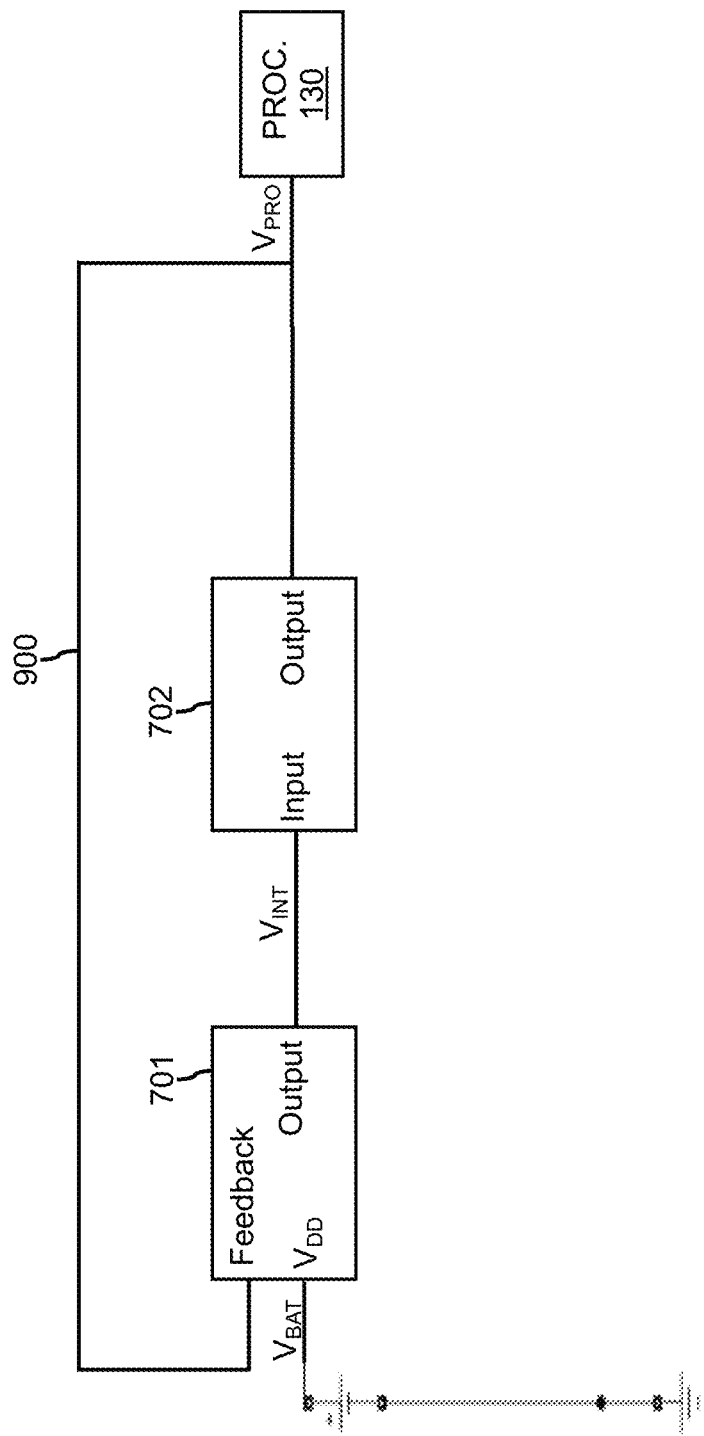
FIG. 9 is a simplified circuit diagram of one of the feedback mechanisms in the assemblies illustrated in FIGS. 1-5.
Figure 10:
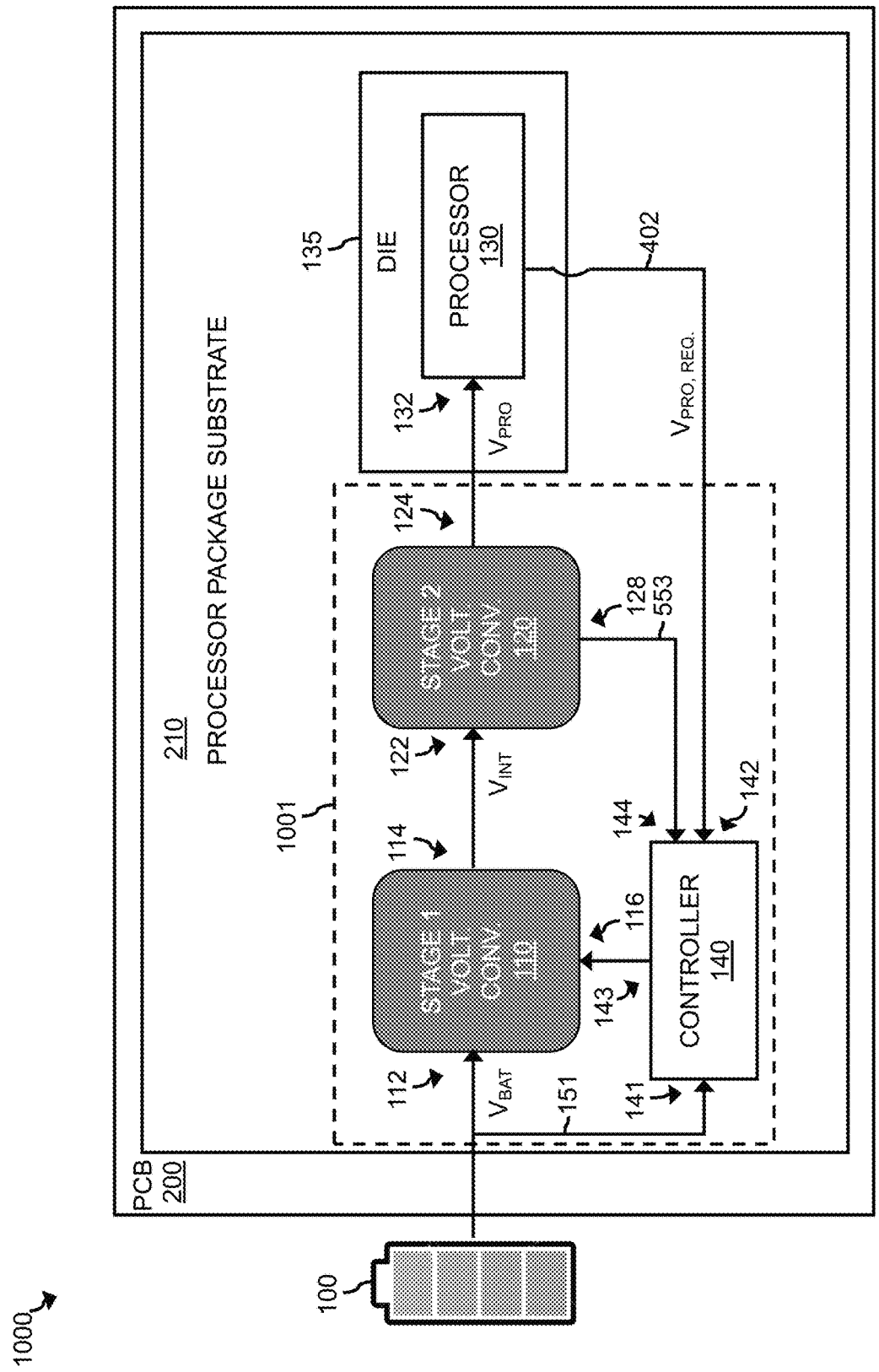
FIG. 10 is a block diagram of an assembly according to an alternative embodiment.
Figure 11:
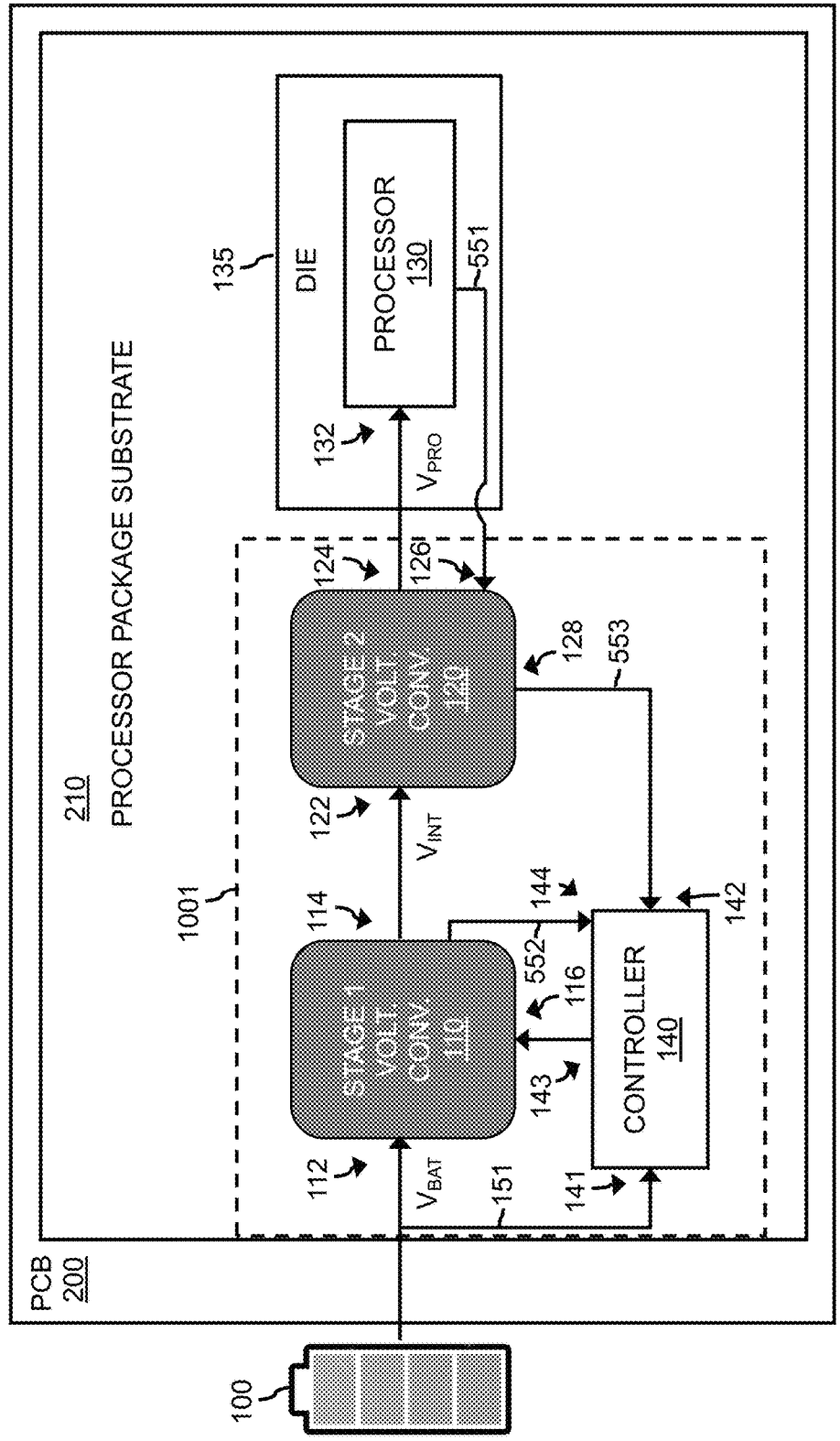
FIG. 11 is a block diagram of another embodiment of an assembly.
Figure 12:
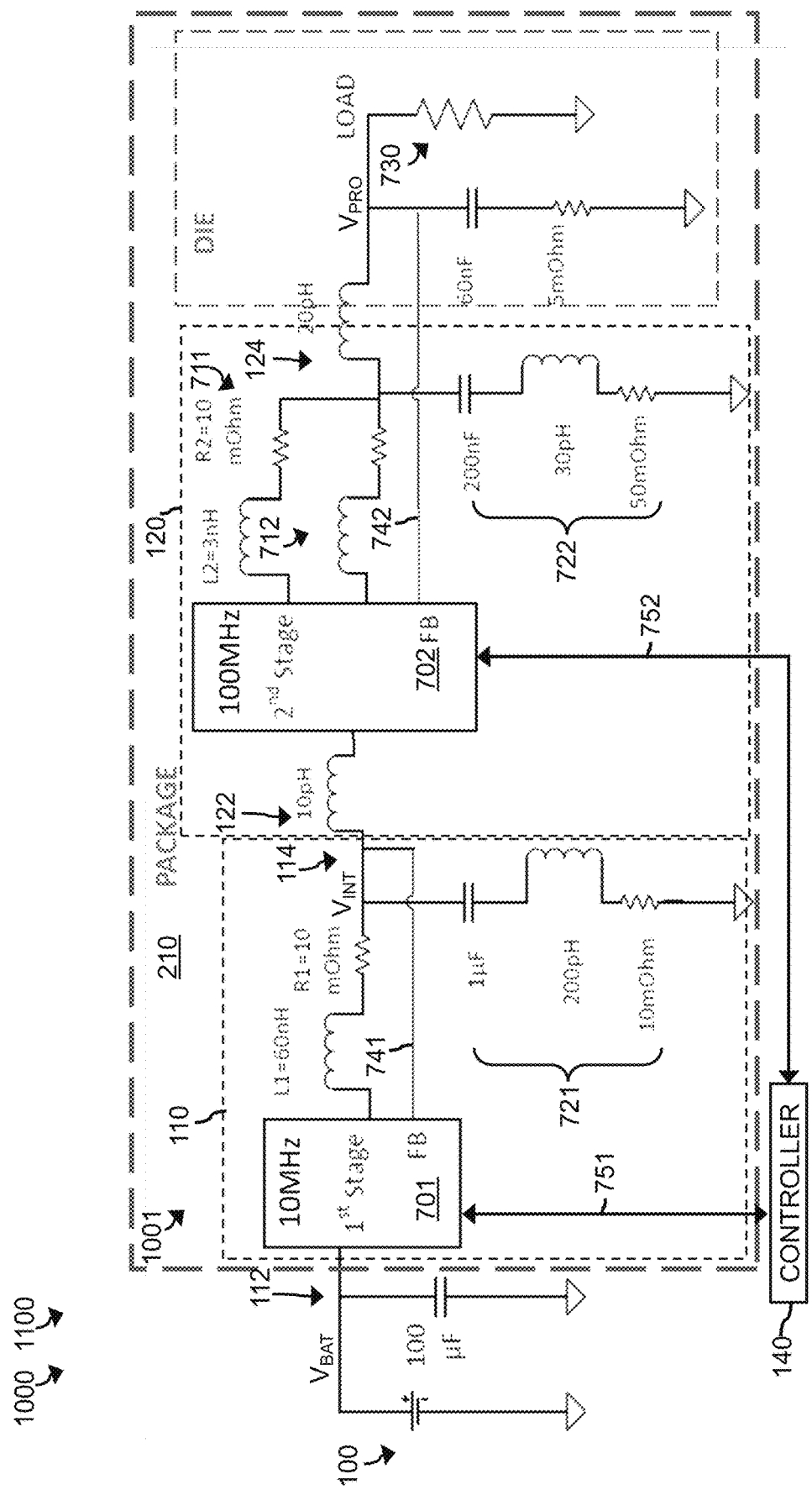
FIG. 12 is an example circuit diagram of the assemblies illustrated in FIGS. 10 and 11.
Figure 13:
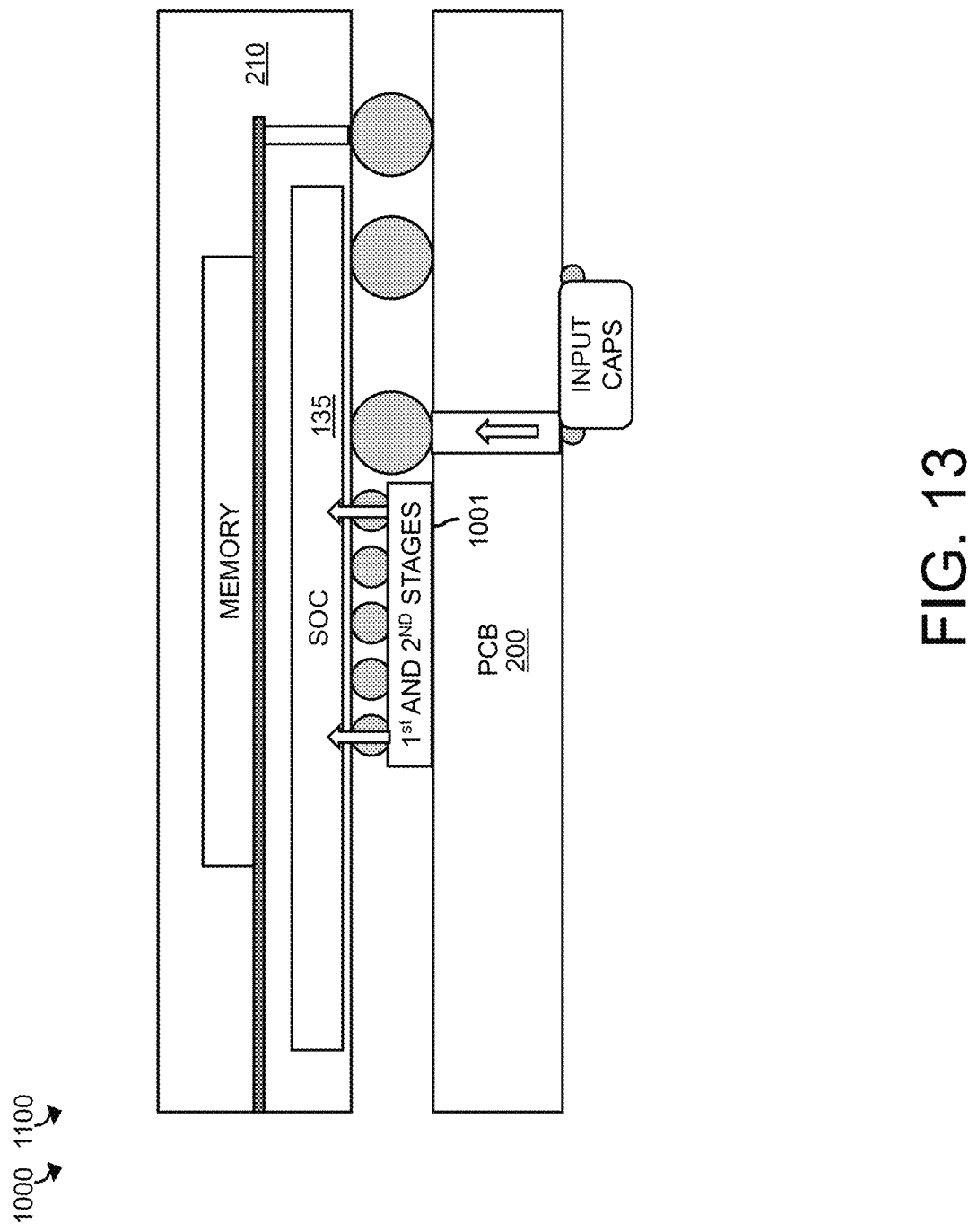
FIG. 13 is an example circuit cross-sectional illustration of the assemblies illustrated in FIGS. 10-12.

FIG. 9 is a simplified circuit diagram of one of the feedback mechanisms in assemblies 10, 30, 40, 50 in which the processor-supply voltage $V_{PRO}$ is provided as feedback to the first voltage converter 701 via feedback line 900, which closes the two conversion stages (e.g., first and second voltage converters 701, 702) in a single feedback loop.

FIGS. 10-13 illustrate assemblies 1000, 1100 according to alternative embodiments. Assemblies 1000, 1100 are the same as assemblies 10, 30 except as described below. In assemblies 1000, 1100, the first-stage voltage converter 110 and the second-stage voltage converter 120 are both mounted on the processor package substrate 210 to form a combined or integrated two-stage voltage converter 1001. In some embodiments, the first-stage voltage converter 110, the second-stage converter 120, and/or the controller 140 can be integrated into the same device and/or into a common housing or package. The controller 140 in assemblies 1000, 1100 can be incorporated in the first stage converter 110, in the second stage converter 120, and/or in the processor 130; depending on where the controller 140 is located, specific arrangements need to be made so that its activation is properly managed during power-up of the system.

In assembly 1000, optional feedback line 553 electrically couples the controller 140 to an output 128 of the second-stage voltage converter 120 (e.g., when the second-stage voltage converter 120 is a switched-capacitor voltage converter) so that the controller 140 can monitor the requested voltage of the processor 130, the processor-supply voltage $V_{PRO}$, the ripple of the processor-supply voltage $V_{PRO}$, and/or the duty cycle of the second-stage voltage converter 120. Feedback line 402 electrically couples an input 142 of the controller 140 to an output of the processor 130 so that the controller 140 can monitor the requested voltage of the processor 130, the processor-supply voltage $V_{PRO}$, the ripple of the processor-supply voltage $V_{PRO}$, and/or the duty cycle of the second-stage voltage converter 120. The controller 140 can be configured to change the operating mode of the first-stage voltage converter 110 (e.g., a three-level voltage converter), such as to a two-level mode, or enable a low-dropout regulator in series with the switched-capacitor voltage converter to modify a conversion ratio of the first-stage voltage converter 110.

Figure 14:
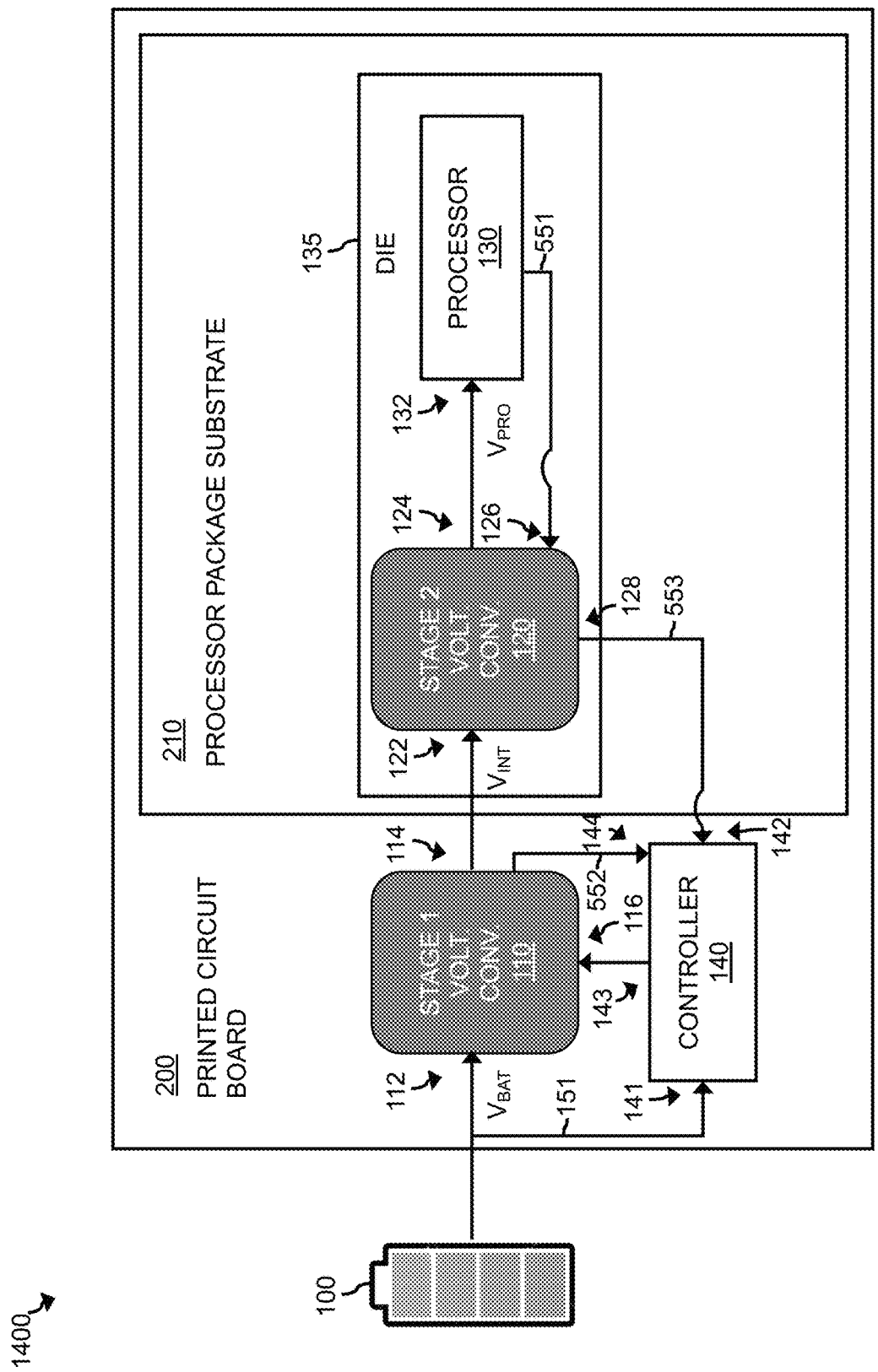
FIG. 14 is a block diagram of an assembly according to an alternative embodiment.
Figure 15:
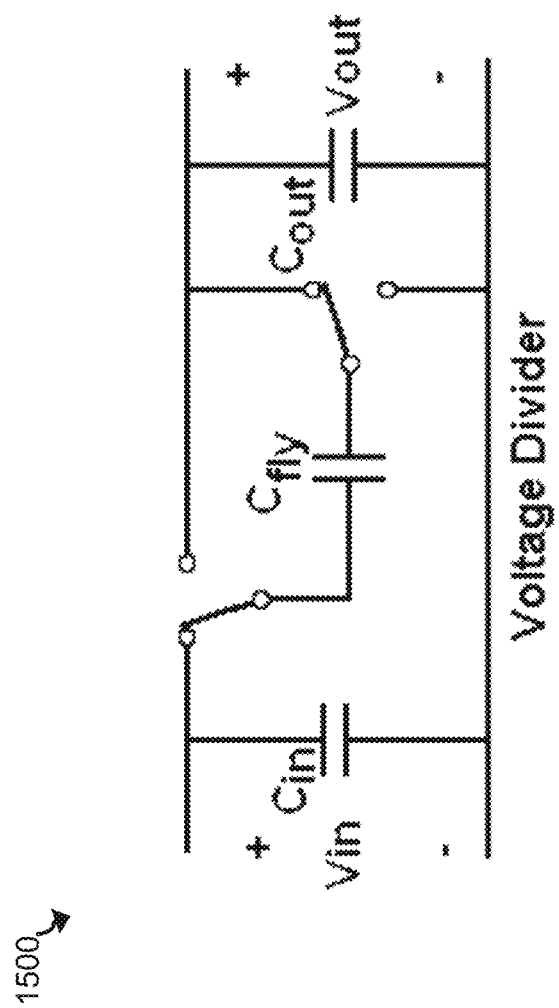
FIG. 15 is circuit diagram of an example divide-by-two voltage divider according to an embodiment.

FIG. 14 illustrates an assembly 1400 that is the same as assemblies 10, 30, 40, 50 except that the second-stage voltage converter 120 is integrated into and/or mounted on the same package or die 135 (e.g., SoC) as the processor 130. In this embodiment, the second-stage voltage converter 120 can be a switched-capacitor voltage converter such as a divide-by-two voltage divider 1500 illustrated in FIG. 15. The voltage divider 1500 can have another ratio such as divide-by-three, divide-by-four, and/or another ratio. This simplified implementation allows the second-stage voltage converter 120 to be integrated into and/or mounted on the same package or die 135 (e.g., SoC) as the processor 130, allowing the output inductor of the second-stage voltage converter 120 and the parasitic interconnect elements to be removed, which reduces the size and costs of the second-stage voltage converter 120. In addition, this simplified implementation allows the second-stage voltage converter 120 to operate without a local controller, which further reduces size and costs. In some embodiments, the switched-capacitor voltage converter can be combined with an LDO regulator to improve accuracy of the processor-supply voltage $V_{PRO}$ though conversion efficiency may be reduced with the inclusion of the LDO regulator.

The first-stage voltage converter 110 can be implemented in older power technologies (e.g., 0.13 um BCD) while the second-stage voltage converter 120 can be implemented on advanced CMOS Technologies, such as 5 nm or smaller, which can yield a smaller area and have a higher operating efficiency, thereby reducing heating of the package 135 (e.g., SoC).

In some embodiments, the invention can include improving settling time by adjusting delay and overshoot of the first-stage voltage converter 110 to cancel the delay and overshoot of the second-stage voltage converter 120. An underdamped response of the two stages 110, 120 can help cancel over/undershoot.

Thus, a combination of two three-level voltage converters provides for high power-conversion efficiency while allowing the second-stage inductor to be integrated in the processor. A master controller in addition to local controllers for the three-level voltage converters can provide the optimal setting for best ripple and efficiency at the load. A further cost and system area and part reduction can be realized by combining three-level voltage converter in the first stage and a switched-capacitor voltage converter in the second stage. The switched-capacitor voltage converter can be fully integrated on the SoC target silicon. The result is minimal area and cost without having a local controller for the second stage, as is the case when the second stage comprises a three-level voltage converter, while still providing equivalent performance. The local controller for the three-level voltage converter in the first stage operates under the control of a master controller. A single (e.g., master) controller for two power-conversion stages has not been presented in previous disclosures or technical literature.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An assembly comprising:
   a first three-level voltage converter having an input electrically coupled to a voltage source to receive a battery-supply voltage, the first three-level voltage converter configured to convert the battery-supply voltage to an intermediate voltage at an output of the first three-level voltage converter, the intermediate voltage lower than the battery-supply voltage;
   a processor module comprising:
      a processor package substrate;
      a second three-level voltage converter mounted on the processor package substrate, the second three-level voltage converter having an input electrically coupled to the output of the first three-level voltage converter to receive the intermediate voltage, the second three-level voltage converter configured to convert the intermediate voltage to a processor-supply voltage at an output of the second three-level voltage converter, the processor-supply voltage lower than the intermediate voltage; and
      a processor chip mounted on the processor package substrate, the processor chip having an input that is electrically coupled to the output of the second three-level voltage converter to receive the processor-supply voltage; and
   a controller that adjusts the intermediate voltage depending on the battery-supply voltage and a requested voltage by the processor to maximize a voltage conversion efficiency and/or to reduce a processor-supply voltage ripple;
   wherein the controller is integrated with the first three-level voltage converter, with the second three-level voltage converter and/or inside the processor chip.

2. The assembly of claim 1, wherein the first three-level voltage converter, the second three-level voltage converter, and the controller are integrated in the same semiconductor process, which can be separate or co-integrated with the processor.

3. The assembly of claim 1, wherein the first three-level voltage converter and the controller are mounted on the processor package substrate.

4. An assembly comprising:
a first three-level voltage converter having an input electrically coupled to a voltage source to receive a battery-supply voltage, the first three-level voltage converter configured to convert the battery-supply voltage to an intermediate voltage at an output of the first three-level voltage converter, the intermediate voltage lower than the battery-supply voltage;
a processor module comprising:
a processor package substrate;
a second three-level voltage converter mounted on the processor package substrate, the second three-level voltage converter having an input electrically coupled to the output of the first three-level voltage converter to receive the intermediate voltage, the second three-level voltage converter configured to convert the intermediate voltage to a processor-supply voltage at an output of the second three-level voltage converter, the processor-supply voltage lower than the intermediate voltage; and
a processor chip mounted on the processor package substrate, the processor chip having an input that is electrically coupled to the output of the second three-level voltage converter to receive the processor-supply voltage; and
a controller that adjusts the intermediate voltage depending on the battery-supply voltage and a requested voltage by the processor to maximize a voltage conversion efficiency and/or to reduce a processor-supply voltage ripple;
wherein:
the first three-level voltage converter is configured to operate at a first frequency,
the second three-level voltage converter is configured to operate at a second frequency, and
the second frequency is higher than the first frequency.

5. The assembly of claim 4, wherein the second frequency is harmonically related to the first frequency and is 8 to 25 times higher than the first frequency.

6. An assembly comprising:
a first three-level voltage converter having an input electrically coupled to a voltage source to receive a battery-supply voltage, the first three-level voltage converter configured to convert the battery-supply voltage to an intermediate voltage at an output of the first three-level voltage converter, the intermediate voltage lower than the battery-supply voltage;
a processor module comprising:
a processor package substrate;
a second three-level voltage converter mounted on the processor package substrate, the second three-level voltage converter having an input electrically coupled to the output of the first three-level voltage converter to receive the intermediate voltage, the second three-level voltage converter configured to convert the intermediate voltage to a processor-supply voltage at an output of the second three-level voltage converter, the processor-supply voltage lower than the intermediate voltage; and
a processor chip mounted on the processor package substrate, the processor chip having an input that is electrically coupled to the output of the second three-level voltage converter to receive the processor-supply voltage; and
a controller that adjusts the intermediate voltage depending on the battery-supply voltage and a requested voltage by the processor to maximize a voltage conversion efficiency and/or to reduce a processor-supply voltage ripple;
wherein an input of the controller is electrically coupled to the voltage source to receive the battery-supply voltage; and
wherein:
the input of the controller is a first input,
the output of the first three-level voltage converter is a first output,
the output of the second three-level voltage converter is a first output,
a second input of the controller is electrically coupled to a second output of the first three-level voltage converter,
a third input of the controller is electrically coupled to a second output of the second three-level voltage converter, and
the controller is configured to receive a first duty-cycle feedback signal from the first three-level voltage converter and a second duty-cycle feedback signal from the second three-level voltage converter, the first duty-cycle feedback signal indicating a duty cycle of the first three-level voltage converter, the second duty-cycle feedback signal indicating a duty cycle of the second three-level voltage converter.

7. The assembly of claim 6, wherein the controller is configured to vary the duty cycle of the first three-level voltage converter to adjust the intermediate voltage.

8. The assembly of claim 7, wherein the controller is configured to:
sweep the intermediate voltage over a range while monitoring the duty cycles of the first and second three-level voltage converters to determine an optimal intermediate voltage at which a product of the duty cycles of the first and second three-level voltage converters is minimized to maximize the voltage conversion efficiency, and
set the duty cycle of the first three-level voltage converter such that the first three-level voltage converter produces the optimal intermediate voltage.

9. The assembly of claim 7, wherein the controller is configured to:
sweep the intermediate voltage over a range while monitoring the processor-supply voltage to determine an optimal intermediate voltage at which the processor-supply voltage ripple is minimized, and
set the duty cycle of the first three-level voltage converter such that the first three-level voltage converter produces the optimal intermediate voltage.

10. An assembly comprising:
a three-level voltage converter having an input electrically coupled to a voltage source to receive a battery-supply voltage, the three-level voltage converter configured to convert the battery-supply voltage to an intermediate voltage at an output of the three-level voltage converter, the intermediate voltage lower than the battery-supply voltage;
a processor module comprising:
a processor package substrate;
a switched-capacitor voltage converter mounted on the processor package substrate, the switched-capacitor voltage converter having an input electrically coupled to the output of the three-level voltage converter to receive the intermediate voltage, the switched-capacitor voltage converter configured to convert the intermediate voltage to a processor-supply voltage at an output of the switched-capacitor voltage converter, the processor-supply voltage lower than the intermediate voltage; and a processor chip mounted on the processor package substrate, the processor chip having an input that is electrically coupled to the output of the switched-capacitor voltage converter to receive the processor-supply voltage;

a controller; and a feedback line that electrically couples the output of the switched-capacitor voltage converter to an input of the controller.

11. The assembly of claim 10, wherein the switched-capacitor voltage converter comprises a fixed-ratio switched-capacitor voltage converter.

12. The assembly of claim 11, wherein the fixed-ratio switched-capacitor voltage converter is configured to operate at a fixed frequency.

13. The assembly of claim 12, wherein the three-level voltage converter and the fixed-ratio switched-capacitor voltage converter operate at different harmonically-related frequencies.

14. The assembly of claim 10, wherein:
the input of the three-level voltage converter is a first input, and
the assembly further comprises:
 a first feedback line that electrically couples an output of the voltage source to a first input of the controller;
 a second feedback line that electrically couples an output of the processor chip to a second input of the controller to receive a processor-supply requested voltage; and
 a third feedback line that electrically couples the output of the switched-capacitor voltage converter to a third input of the controller,
wherein the controller is configured to change the operating mode of the three-level converter to a two-level mode or enable a low-dropout regulator in series with the switched-capacitor voltage converter to modify a conversion ratio of the three-level voltage converter.

15. An assembly comprising:
a first three-level voltage converter having an input electrically coupled to a voltage source to receive a battery-supply voltage, the first three-level voltage converter configured to convert the battery-supply voltage to an intermediate voltage at an output of the first three-level voltage converter, the intermediate voltage lower than the battery-supply voltage;
a processor module comprising:
 a processor package substrate;
 a second three-level voltage converter mounted on the processor package substrate, the second three-level voltage converter having an input electrically coupled to the output of the first three-level voltage converter to receive the intermediate voltage, the second three-level voltage converter configured to convert the intermediate voltage to a processor-supply voltage at an output of the second three-level voltage converter, the processor-supply voltage lower than the intermediate voltage; and
 a processor chip mounted on the processor package substrate, the processor chip having an input that is electrically coupled to the output of the second three-level voltage converter to receive the processor-supply voltage; and
a controller that adjusts the intermediate voltage depending on the battery-supply voltage and a requested voltage by the processor to maximize a voltage conversion efficiency and/or to reduce a processor-supply voltage ripple;
wherein the first three-level voltage converter comprises a single phase and the second three-level voltage converter comprises a multi-phase interleaved three-level voltage converter.

16. An assembly comprising:
a first three-level voltage converter having an input electrically coupled to a voltage source to receive a battery-supply voltage, the first three-level voltage converter configured to convert the battery-supply voltage to an intermediate voltage at an output of the first three-level voltage converter, the intermediate voltage lower than the battery-supply voltage;
a processor module comprising:
 a processor package substrate;
 a second three-level voltage converter mounted on the processor package substrate, the second three-level voltage converter having an input electrically coupled to the output of the first three-level voltage converter to receive the intermediate voltage, the second three-level voltage converter configured to convert the intermediate voltage to a processor-supply voltage at an output of the second three-level voltage converter, the processor-supply voltage lower than the intermediate voltage; and
 a processor chip mounted on the processor package substrate, the processor chip having an input that is electrically coupled to the output of the second three-level voltage converter to receive the processor-supply voltage; and
a controller that adjusts the intermediate voltage depending on the battery-supply voltage and a requested voltage by the processor to maximize a voltage conversion efficiency and/or to reduce a processor-supply voltage ripple;
where a delay and an overshoot of the first three-level voltage converter are designed to at least partially cancel an overshoot or an undershoot of the processor-supply voltage, thus improving a settling time of the processor-supply voltage.

* * * * *